US012608149B2

(12) United States Patent
    Kantani et al.

(10) Patent No.: US 12,608,149 B2
(45) Date of Patent: Apr. 21, 2026

(54) MEMORY SYSTEM

(71) Applicant: Kioxia Corporation, Tokyo (JP)

(72) Inventors: Tomoyuki Kantani, Yokohama Kanagawa (JP); Kousuke Fujita, Yokohama Kanagawa (JP); Iku Endo, Odawara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/797,068

(22) Filed: Aug. 7, 2024

(65) Prior Publication Data

US 2024/0393971 A1     Nov. 28, 2024

Related U.S. Application Data

(63) Continuation of application No. 18/176,452, filed on Feb. 28, 2023, now Pat. No. 12,099,735.

(30) Foreign Application Priority Data

Sep. 16, 2022     (JP) ................................. 2022-148464

(51) Int. Cl.
    *G06F 3/06*          (2006.01)
(52) U.S. Cl.
    CPC ............ *G06F 3/064* (2013.01); *G06F 3/0607* (2013.01); *G06F 3/0659* (2013.01); *G06F 3/0679* (2013.01)

(58) Field of Classification Search
    None
    See application file for complete search history.

(56) References Cited

U.S. PATENT DOCUMENTS

| | | | |
|---|---|---|---|
| 10,599,561 B2 | 3/2020 | Nishikubo | |
| 11,042,307 B1 | 6/2021 | Li | |
| 2012/0068244 A1* | 3/2012 | Kato ...................... H10B 41/30 |
| | | | 257/315 |
| 2019/0187902 A1 | 6/2019 | Lee | |
| 2019/0265910 A1 | 8/2019 | Toyooka | |
| 2021/0133099 A1 | 5/2021 | Muchherla | |
| 2021/0248034 A1* | 8/2021 | Takubo ............... G06F 11/0766 |

* cited by examiner

*Primary Examiner* — Brian R Peugh
(74) *Attorney, Agent, or Firm* — Kim & Stewart LLP

(57)     ABSTRACT

A memory system includes a non-volatile memory and a memory controller. The memory controller is configured to perform a write operation on the non-volatile memory in response to a write command from a host by writing system data in a first mode to a first block of the non-volatile memory, the first mode being a write mode for writing data with a first number of bits per memory cell, writing user data in the first mode to a second block of the non-volatile memory when the write command is of a first type, and writing user data in a second mode to a third block of the non-volatile memory when the write command is of a second type. The second mode is a write mode for writing data with a second number of bits larger than the first number of bits per memory cell.

12 Claims, 18 Drawing Sheets

| HOST ADDRESS(LBA) | MEMORY ADDRESS(PBA) | VALID-AND-INVALID FLAG | DATA IDENTIFICATION FLAG |
|---|---|---|---|
| 0 | — | 0 | — |
| 1 | — | 0 | — |
| 2 | — | 0 | — |
| 3 | — | 0 | — |
| ⋮ | ⋮ | ⋮ | ⋮ |

*FIG. 1*

| HOST ADDRESS(LBA) | MEMORY ADDRESS(PBA) | VALID-AND-INVALID FLAG |
|---|---|---|
| 0 | — | 0 |
| 1 | — | 0 |
| 2 | — | 0 |
| 3 | — | 0 |
| ⋮ | ⋮ | ⋮ |

FIG. 5

| HOST ADDRESS (LBA) | MEMORY ADDRESS (PBA) | VALID-AND-INVALID FLAG |
|---|---|---|
| 0 | Blk0, Page0 | 1 |
| 1 | Blk0, Page1 | 1 |
| 2 | Blk0, Page2 | 1 |
| 3 | Blk0, Page3 | 1 |
| ⋮ | ⋮ | ⋮ |

FIG. 6

| HOST ADDRESS (LBA) | MEMORY ADDRESS (PBA) | VALID-AND-INVALID FLAG |
|---|---|---|
| 0 | Blk0, Page0 | 1 |
| 1 | Blk0, Page1 | 1 |
| 2 | Blk0, Page2 | 1 |
| — | Blk0, Page3 | 0 |
| 3 | Blk0, Page4 | 1 |
| ⋮ | ⋮ | ⋮ |

FIG. 7

| HOST ADDRESS (LBA) | MEMORY ADDRESS (PBA) | VALID-AND-INVALID FLAG |
|---|---|---|
| — | Blk0, Page0 | 0 |
| — | Blk0, Page1 | 0 |
| — | Blk0, Page2 | 0 |
| — | Blk0, Page3 | 0 |
| — | Blk0, Page4 | 0 |
| ⋮ | ⋮ | ⋮ |
| 0 | Blk1, Page0 | 1 |
| 1 | Blk1, Page1 | 1 |
| 2 | Blk1, Page2 | 1 |
| 3 | Blk1, Page3 | 1 |
| ⋮ | ⋮ | ⋮ |

FIG. 8

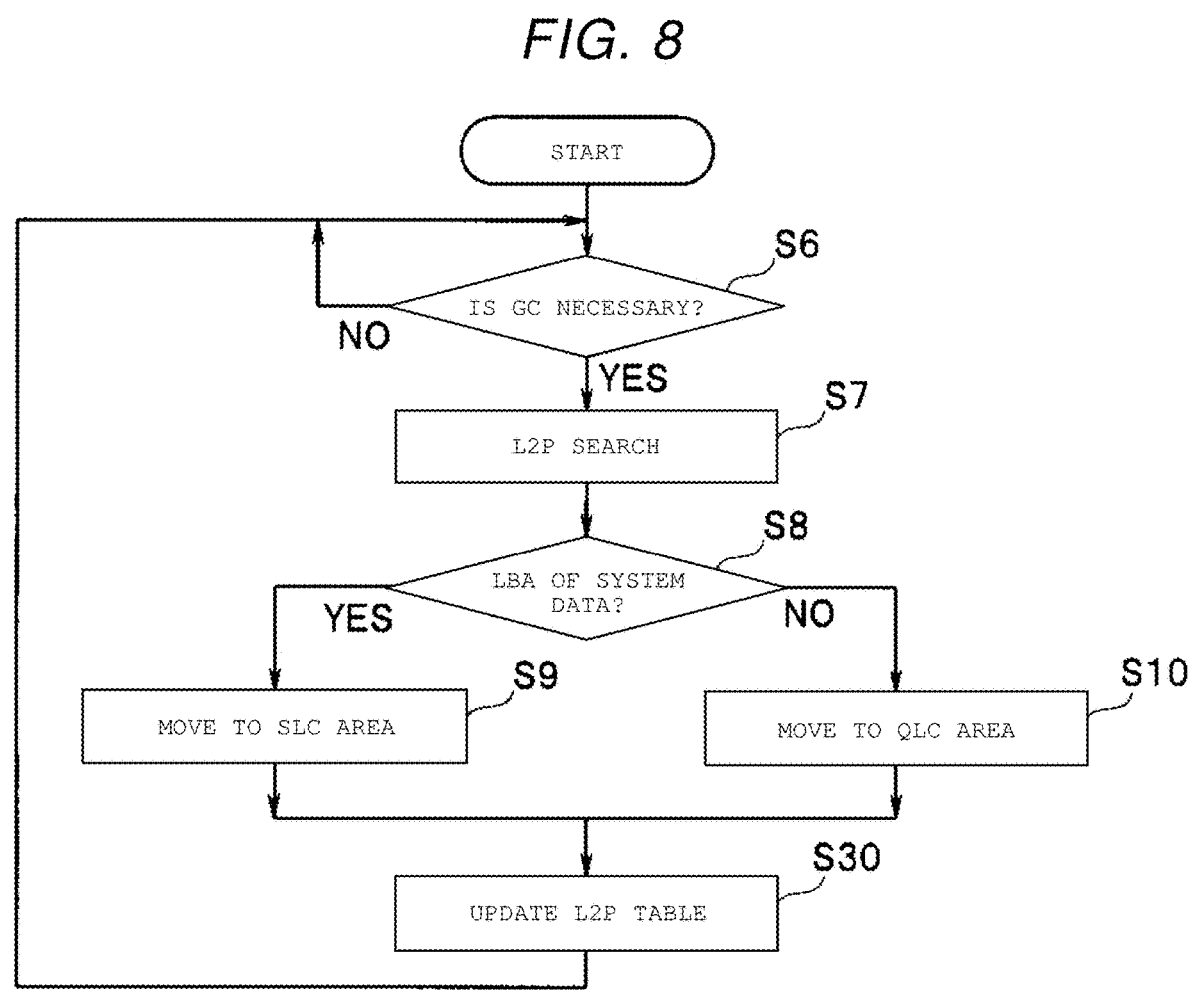

START

IS GC NECESSARY? — S6

NO

YES

L2P SEARCH — S7

LBA OF SYSTEM DATA? — S8

YES

NO

MOVE TO SLC AREA — S9

MOVE TO QLC AREA — S10

UPDATE L2P TABLE — S30

| DATA BODY | IDENTIFICATION FLAG |
|---|---|

*FIG. 11*

| Bit \ Byte | 7 | 6 | 5 | 4 | 3 | 2 | 1 | 0 |
|---|---|---|---|---|---|---|---|---|
| 0 | OPERATION CODE(2Ah) | | | | | | | |
| 1 | WRPROTECT =000b | | | DPO | FUA | Reserved | FUA_NV =0b | Obsolete |
| 2 | (MSB) | | | | | | | |
| 3 | LOGICAL BLOCK ADDRESS | | | | | | | |
| 4 | | | | | | | | |
| 5 | | | | | | | | (LSB) |
| 6 | Reserved | | | GROUP NUMBER | | | | |
| 7 | (MSB) | | | | | | | |
| 8 | TRANSFER LENGTH | | | | | | | |
| 9 | | | | | | | | (LSB) |
| | CONTROL = 00h | | | | | | | |

| HOST ADDRESS (LBA) | MEMORY ADDRESS (PBA) | VALID-AND-INVALID FLAG | DATA IDENTIFICATION FLAG |
|---|---|---|---|
| 0 | – | 0 | – |
| 1 | – | 0 | – |
| 2 | – | 0 | – |
| 3 | – | 0 | – |
| ⋮ | ⋮ | ⋮ | ⋮ |

FIG. 15

| HOST<br>ADDRESS(LBA) | MEMORY<br>ADDRESS(PBA) | VALID-AND-INVALID<br>FLAG | DATA<br>IDENTIFICATION<br>FLAG |
|---|---|---|---|
| 0 | Blk0, Page0 | 1 | SYSTEM |
| 1 | Blk0, Page1 | 1 | SYSTEM |
| 2 | Blk0, Page2 | 1 | SYSTEM |
| 3 | Blk0, Page3 | 1 | USER |
| ⋮ | ⋮ | ⋮ | ⋮ |

FIG. 16

| HOST<br>ADDRESS(LBA) | MEMORY<br>ADDRESS(PBA) | VALID-AND-INVALID<br>FLAG | DATA<br>IDENTIFICATION<br>FLAG |
|---|---|---|---|
| 0 | Blk0, Page0 | 1 | SYSTEM |
| 1 | Blk0, Page1 | 1 | SYSTEM |
| — | Blk0, Page2 | 0 | — |
| 3 | Blk0, Page3 | 1 | USER |
| 2 | Blk0, Page4 | 1 | SYSTEM |
| ⋮ | ⋮ | ⋮ | ⋮ |

| HOST ADDRESS (LBA) | MEMORY ADDRESS (PBA) | VALID-AND-INVALID FLAG | DATA IDENTIFICATION FLAG |
|---|---|---|---|
| — | Blk0, Page0 | 0 | — |
| — | Blk0, Page1 | 0 | — |
| — | Blk0, Page2 | 0 | — |
| — | Blk0, Page3 | 0 | — |
| — | Blk0, Page4 | 0 | — |
| ⋮ | ⋮ | ⋮ | ⋮ |
| 0 | Blk1, Page0 | 1 | SYSTEM |
| 1 | Blk1, Page1 | 1 | SYSTEM |
| 2 | Blk1, Page2 | 1 | SYSTEM |
| 3 | Blk11, Page0 | 1 | USER |
| ⋮ | ⋮ | ⋮ | ⋮ |

| HOST ADDRESS (LBA) | MEMORY ADDRESS (PBA) | VALID-AND-INVALID FLAG | NUMBER OF DATA READ OPERATIONS | DETERMINATION RESULT |
|---|---|---|---|---|
| 0 | Blk0, Page0 | 1 | 100 | SYSTEM |
| 1 | Blk0, Page1 | 1 | 1 | USER |
| 2 | Blk0, Page2 | 1 | 10 | USER |
| 3 | Blk0, Page3 | 1 | 100 | SYSTEM |
| ⋮ | ⋮ | ⋮ | ⋮ | ⋮ |

*FIG. 21*

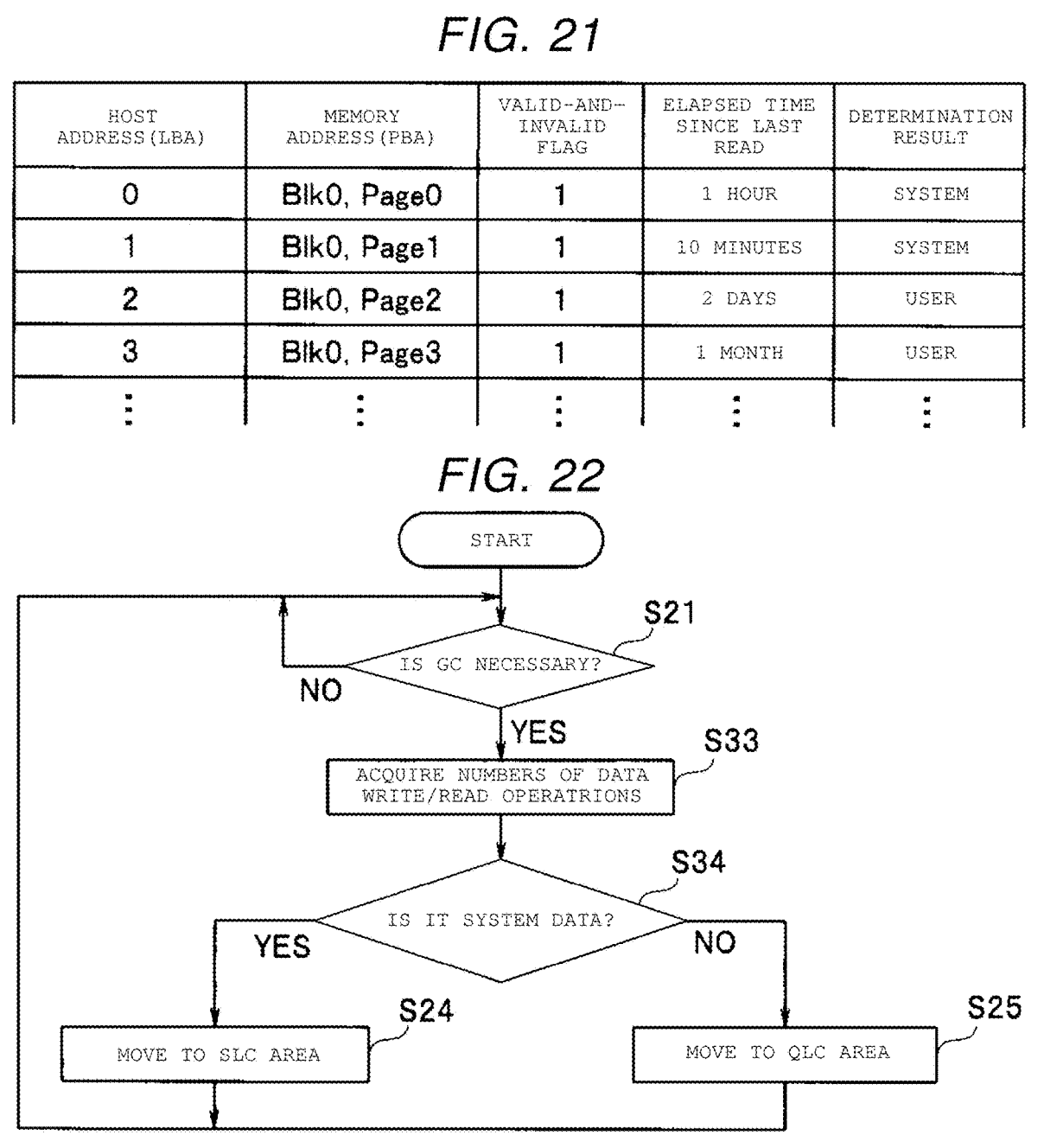

| HOST ADDRESS(LBA) | MEMORY ADDRESS(PBA) | VALID-AND-INVALID FLAG | ELAPSED TIME SINCE LAST READ | DETERMINATION RESULT |
|---|---|---|---|---|
| 0 | Blk0, Page0 | 1 | 1 HOUR | SYSTEM |
| 1 | Blk0, Page1 | 1 | 10 MINUTES | SYSTEM |
| 2 | Blk0, Page2 | 1 | 2 DAYS | USER |
| 3 | Blk0, Page3 | 1 | 1 MONTH | USER |
| ⋮ | ⋮ | ⋮ | ⋮ | ⋮ |

*FIG. 22*

```
                    ┌─────────┐
                    │  START  │
                    └────┬────┘
                         │
  ┌──────────────────────┤
  │          ◇           │              S21
  │    IS GC NECESSARY? ──┘
  │ NO  ◇
  │          │ YES
  │          ▼                          S33
  │  ┌────────────────────────────┐
  │  │ ACQUIRE NUMBERS OF DATA     │
  │  │ WRITE/READ OPERATRIONS      │
  │  └──────────────┬─────────────┘
  │                 │
  │                 ▼              S34
  │        ◇ IS IT SYSTEM DATA? ◇
  │  YES ◇                      ◇ NO
  │      │                        │
  │   S24│                        │ S25
  │  ┌───▼──────────┐      ┌───────▼──────┐
  │  │ MOVE TO SLC  │      │ MOVE TO QLC  │
  │  │    AREA      │      │    AREA      │
  │  └───┬──────────┘      └───────┬──────┘
  │      │                         │
  └──────┴─────────────────────────┘
```

FIG. 23

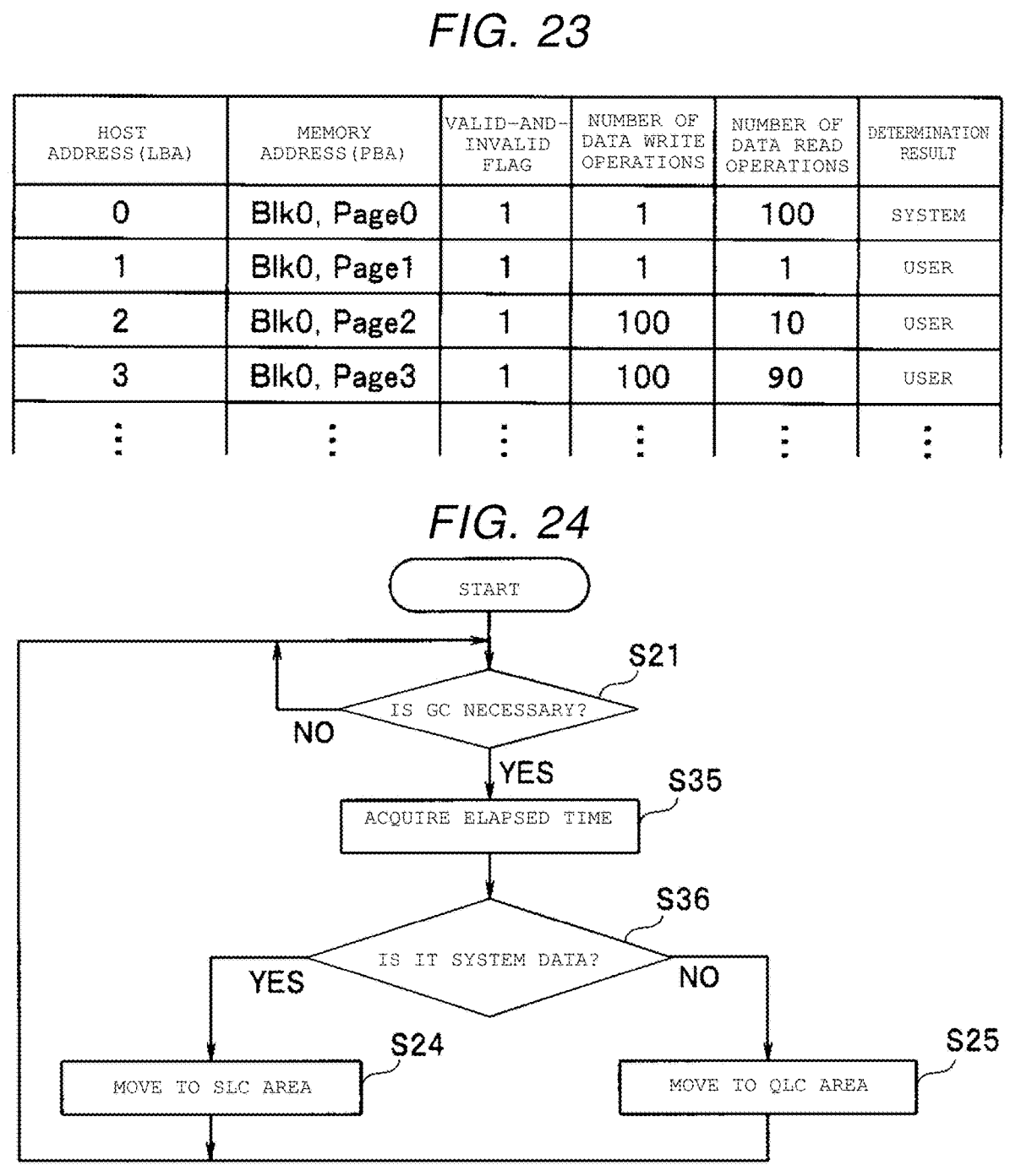

| HOST ADDRESS (LBA) | MEMORY ADDRESS (PBA) | VALID-AND-INVALID FLAG | NUMBER OF DATA WRITE OPERATIONS | NUMBER OF DATA READ OPERATIONS | DETERMINATION RESULT |
|---|---|---|---|---|---|
| 0 | Blk0, Page0 | 1 | 1 | 100 | SYSTEM |
| 1 | Blk0, Page1 | 1 | 1 | 1 | USER |
| 2 | Blk0, Page2 | 1 | 100 | 10 | USER |
| 3 | Blk0, Page3 | 1 | 100 | 90 | USER |
| ⋮ | ⋮ | ⋮ | ⋮ | ⋮ | ⋮ |

FIG. 24

START

S21 — IS GC NECESSARY?

NO

YES

S35 — ACQUIRE ELAPSED TIME

S36 — IS IT SYSTEM DATA?

YES

NO

S24 — MOVE TO SLC AREA

S25 — MOVE TO QLC AREA

| HOST ADDRESS (LBA) | MEMORY ADDRESS (PBA) | VALID-AND-INVALID FLAG | ELAPSED TIME SINCE LAST WRITE | ELAPSED TIME SINCE LAST READ | DETERMINATION RESULT |
|---|---|---|---|---|---|
| 0 | Blk0, Page0 | 1 | 1 MONTH | 1 HOUR | SYSTEM |
| 1 | Blk0, Page1 | 1 | 1 HOUR | 10 MINUTES | USER |
| 2 | Blk0, Page2 | 1 | 1 MONTH | 2 DAYS | USER |
| 3 | Blk0, Page3 | 1 | 1 MONTH | 1 MONTH | USER |
| ⋮ | ⋮ | ⋮ | ⋮ | ⋮ | ⋮ |

START

S51 — DATA MOVEMENT?

NO

YES

S52 — ACQUIRE NUMBER OF DATA READ OPERATIONS

S53 — IS ACQUIRED NUMBER IN TOP RANKS?

YES      NO

S54 — MOVE TO SLC AREA

S55 — MOVE TO QLC AREA

MEMORY SYSTEM

CROSS-REFERENCE TO RELATED APPLICATION

This application is a continuation of U.S. patent application Ser. No. 18/176,452, filed Feb. 28, 2023, now U.S. Pat. No. 12,099,735, which is based upon and claims the benefit of priority from Japanese Patent Application No. 2022-148464, filed Sep. 16, 2022, the entire contents of which are incorporated herein by reference.

FIELD

Embodiments described herein relate generally to a memory system.

BACKGROUND

In recent years, a memory system with a non-volatile memory has become widespread. As one of such memory systems, a solid state drive (SSD) and a universal flash storage (UFS) device having a NAND flash memory are known. There is a need with respect to such memory systems to improve read latency.

DESCRIPTION OF THE DRAWINGS

FIG. 1 is a block diagram showing a configuration example of a memory system according to a first embodiment.

FIG. 3 is a flowchart showing an example of a data write operation by a memory controller according to the first embodiment.

FIGS. 4-7 illustrate changing contents of an L2P table according to the first embodiment.

FIG. 8 is a flowchart showing an example of garbage collection processing by the memory controller according to the first embodiment.

FIG. 11 is a diagram showing a command format of a write command of a UFS standard.

FIG. 13 is a flowchart showing an example of garbage collection processing by the memory controller according to the second embodiment.

FIGS. 14-17 illustrate changing contents of an L2P table according to a modification example of the second embodiment.

FIG. 18 is a flowchart showing an example of garbage collection processing by a memory controller according to a third embodiment.

FIG. 21 is a diagram showing an example of an L2P table according to the fourth embodiment.

FIG. 22 is a flowchart showing an example of garbage collection processing by a memory controller according to a fifth embodiment.

FIG. 23 is a diagram showing an example of an L2P table according to the fifth embodiment.

FIG. 24 is a flowchart showing an example of garbage collection processing by a memory controller according to a sixth embodiment.

DETAILED DESCRIPTION

Figure 2:
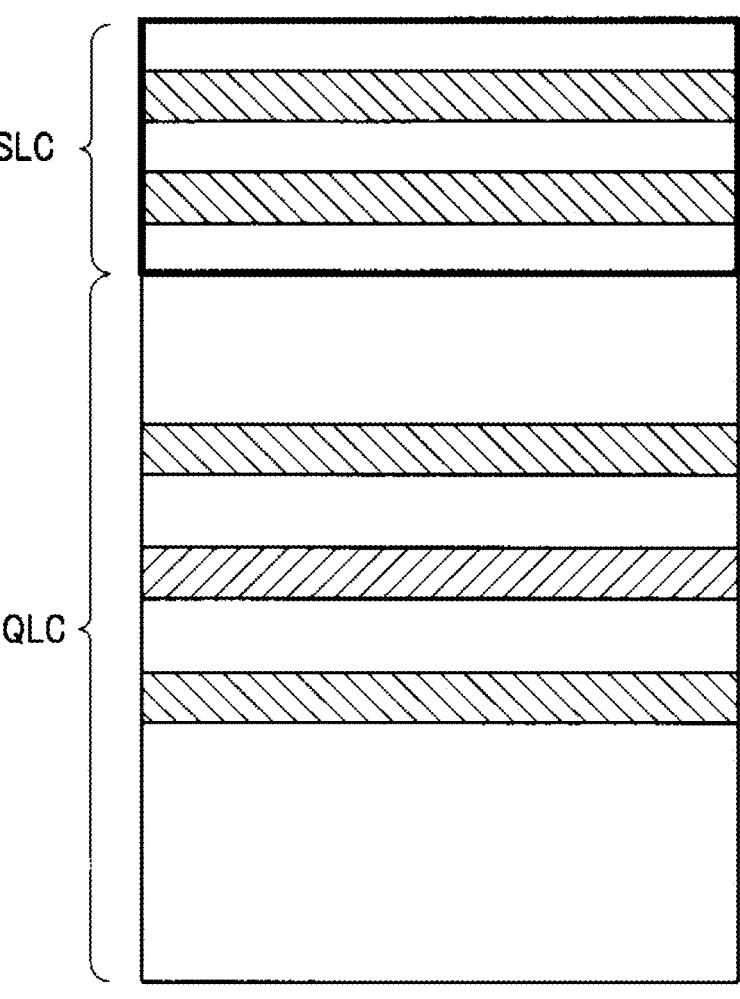
FIG. 2 is a diagram showing a memory layout of a non-volatile memory according to the first embodiment.

Embodiments provide a memory system that can improve read latency.

In general, according to one embodiment, a memory system includes a non-volatile memory having a first area and a second area each containing a plurality of blocks, and a memory controller electrically connected to the non-volatile memory, and configured to write data in a first mode to a first block of the first area. The first mode is a write mode for writing data with a first number of bits per memory cell. The memory controller is further configured to execute copy processing on the data, which have been written in the first mode to the first block, by writing system data written in the first block to a second block of the first area in the first mode and writing user data written in the first block to a third block of the second area in the second mode. The second mode is a write mode for writing data with a second number of bits larger than the first number of bits per memory cell.

Hereinafter, the present embodiment will be described in detail with reference to the drawings.

First Embodiment

In the present embodiment, data to be read at high speed is determined, and the data to be read at high speed is stored in an area in which high-speed read is possible in a memory cell array although garbage collection is executed. As a result, the present embodiment improves read latency.

<Configuration of Memory System>

Figure 1:
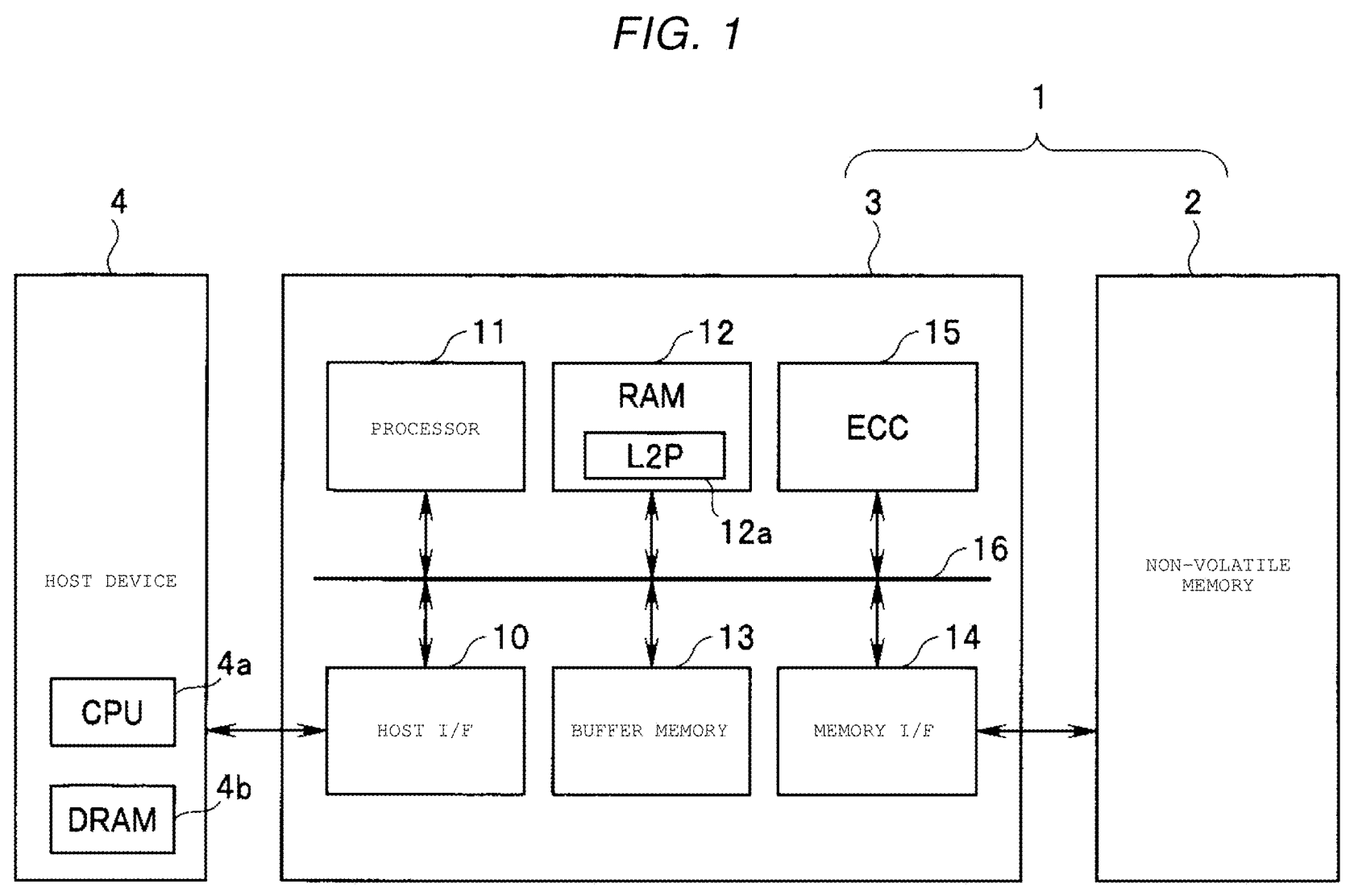

FIG. 1 is a block diagram showing a configuration example of a memory system according to the first embodiment. A memory system 1 of the present embodiment includes a memory controller 3 and a non-volatile memory 2. The non-volatile memory 2 may include a plurality of memory chips. The memory system 1 is connectable with a host device 4. The host device 4 is, for example, an electronic device such as a personal computer or a mobile terminal. The host device 4 has a central processing unit (CPU) 4a, a ROM (not shown), and a dynamic random access memory (DRAM) 4b.

The memory system 1 may be mounted on a motherboard on which the host device 4 is mounted. The memory system 1 may be implemented by a plurality of semiconductor chips. Examples of the memory system 1 include a universal flash storage (UFS) device in which the memory controller 3 and the non-volatile memory 2 are configured as one package, a memory card such as an SD card, a solid-state-drive (SSD), or embedded-multi-media-card (eMMC).

The non-volatile memory 2 is, for example, a NAND flash memory. The non-volatile memory 2 has a memory cell array including a plurality of memory cell transistors. Each of the memory cell transistors is configured to be rewritten. The non-volatile memory 2 includes a plurality of bit lines BL, a plurality of word lines, source line, or the like to control the voltage applied to the memory cell transistor. The non-volatile memory 2 includes a plurality of blocks. Each of the blocks functions as the minimum unit of a data erase operation. Each of the blocks contains a plurality of pages. Each of the pages functions as a unit of a data write operation and a data read operation. Each of the word lines may also function as a unit of a data write operation and a data read operation.

Each of the memory cells of the non-volatile memory 2 can be written with n (n is an integer equal to or greater than 1) bit data. The memory cell may be a single level cell (SLC) configured to store 1-bit data. The memory cell may be a multi-level cell (MLC) configured to store 2-bit data. The memory cell may be a triple level cell (TLC) configured to store 3-bit data. The memory cell may be a quad level cell (QLC) configured to store 4-bit data.

The memory controller 3 may be implemented as a large-scale integrated circuit (LSI) or a system-on-a-chip (SoC). The function of each part of the memory controller 3 may be implemented by dedicated hardware, a processor that executes a program, or a combination thereof.

The memory controller 3 includes a host interface circuit (hereinafter referred to as a host I/F) 10, a processor 11, a RAM 12, a buffer memory 13, a memory interface circuit (hereinafter referred to as a memory I/F) 14, and an error checking and correction circuit (ECC) circuit (hereinafter referred to as an ECC circuit) 15. The host I/F 10, the processor 11, the RAM 12, the buffer memory 13, the memory I/F 14, and the ECC circuit 15 are connected to each other by an internal bus 16.

The processor 11 is implemented by a central processing unit (CPU) or the like. The processor 11 comprehensively controls each part of the memory system 1 by executing a program (firmware) stored in a ROM (not shown). When the processor 11 receives a request from the host device 4 via the host I/F 10, the processor 11 performs various controls by executing processing according to the request. For example, the processor 11 instructs the memory I/F 14 to write data to the non-volatile memory 2 according to a request from the host device 4. Further, the processor 11 instructs the memory I/F 14 to read data from the non-volatile memory 2 according to a request from the host device 4.

When the processor 11 receives a write request of data from the host device 4, the processor 11 determines a storage area (memory area) on the non-volatile memory 2 for the data received from the host device 4. That is, the processor 11 manages a write destination of data. The processor 11 manages the relationship between a host address and a memory address by using a logical-to-physical address conversion table (also referred to as a logical-to-physical table, hereinafter referred to as an L2P table) 12a. The host address is a logical address of data received from the host device 4. An example of the logical address is a logical block address. Hereinafter, the host address is referred to as a host address LBA. A memory address is a physical address indicating a storage area on the non-volatile memory 2 in which data is stored. Hereinafter, the memory address is referred to as a memory address PBA. The L2P table 12a stores data that correlates the host address LBA, which is used when the host device 4 accesses the memory system 1, with the memory address PBA of the non-volatile memory 2. The L2P table 12a is stored in the RAM 12, for example.

Data can be written to one page of the non-volatile memory 2 only once per erasing/writing cycle. Consequently, the processor 11 writes update data corresponding to a certain host address LBA to a different storage position other than the storage position on the non-volatile memory 2 in which previous data corresponding to the host address LBA is stored. The processor 11 invalidates the previous data by updating the L2P table 12a to associate the host address LBA with the different storage position. Data referenced from the L2P table 12a (that is, data associated with the host address LBA) is called valid data. Further, data that is not associated with any host address LBA is called invalid data. The valid data is data that may be read from the host device 4 later. The invalid data is data that is no longer read from the host device 4. A block that stores only invalid data is called a free block.

When the processor 11 receives a write request of data from the host device 4, the processor 11 determines a memory address PBA corresponding to the request. The processor 11 instructs the memory I/F 14 to write the data to the storage area of the determined memory address PBA. The memory controller 3 updates the L2P table 12a to associate the host address LBA related to the request with the determined memory address PBA. The processor 11 performs a non-volatilization process on the L2P table 12a from the RAM 12 to the non-volatile memory 2 at any timing.

When the processor 11 receives a read request of data from the host device 4, the processor 11 refers to the L2P table 12a for the host address LBA specified by the request to determine the memory address PBA. The processor 11 instructs the memory I/F 14 to read data from the storage area of the memory address PBA. That is, when the processor 11 receives a request from the host device 4, the processor 11 determines the memory address PBA corresponding to the host address LBA related to the request and performs data read.

The RAM 12 temporarily stores various data as well as the L2P table 12a.

The ECC circuit 15 encodes data to be written to the non-volatile memory 2. The ECC circuit 15 decodes data read from the non-volatile memory 2.

The buffer memory 13 temporarily stores data received from the host device 4. Further, the buffer memory 13 temporarily stores data read from the non-volatile memory 2. The buffer memory 13 is, for example, a general-purpose memory such as a static random access memory (SRAM) or a dynamic random access memory (DRAM).

The host I/F 10 performs processing between the memory controller 3 and the host device 4 according to an interface standard. The host I/F 10 outputs a request and data received from the host device 4 to the internal bus 16. Further, the host I/F 10 transmits data read from the non-volatile memory 2 and a response or the like from the processor 11 to the host device 4.

The memory I/F 14 performs processing related to writing data to the non-volatile memory 2 and reading data from the non-volatile memory 2 under the control of the processor 11.

FIG. 2 is a diagram showing the memory layout of the non-volatile memory 2. In the example of FIG. 2, the non-volatile memory 2 includes an SLC area and a QLC area. The shaded area in FIG. 2 indicates an area storing valid data.

The SLC area is a storage area in which each of the memory cells is used as an SLC. An MLC area is a storage area in which each of the memory cells is used as an MLC. A TLC area is a storage area in which each of the memory cells is used as a TLC. The QLC area is a storage area in which each of the memory cells is used as a QLC. The memory system 1 has an SLC recording mode (SLC mode) in which 1-bit data is written to each memory cell in the SLC area, an MLC recording mode (MLC mode) in which 2-bit data is written to each memory cell in the MLC area, a TLC recording mode (TLC mode) in which 3-bit data is written for each memory cell in the TLC area, and a QLC recording mode (QLC mode) in which 4-bit data is written to each memory cell in the QLC area. The modes are specified by the memory controller 3. A length of time period to write data (write time) to the SLC area is shorter than that to write data to the MLC area, the TLC area, or the QLC area. Further, a length of time period for reading data (read time) stored in the SLC area is shorter than that stored in the MLC area, the TLC area, or the QLC area. That is, reading data from the SLC area is faster than reading data from an area having memory cells that store a plurality of bits of data (hereinafter also referred to as a multi-level value area). In the following description, the QLC area will be described as an example of the multi-level value area, but the multi-level value area may be the MLC area or the TLC area.

The memory controller 3 may use a certain storage area of the non-volatile memory 2 as a dedicated area for the SLC area or the QLC area, that is, the memory controller 3 may use a certain storage area as the SLC area and may use another area as the QLC area, for the entire lifetime of the memory system 1. Alternatively, the memory controller 3 may use a certain storage area of the non-volatile memory 2 as a shared area for the SLC area or the QLC area. That is, the memory controller 3 may use a certain storage area as the SLC area or as the QLC area. The memory controller 3 writes data to the SLC area or the QLC area or reads data from the SLC area or the QLC area based on a host address LBA related to a request from the host device 4.

As described above, the write speed and read speed for each of the memory cells in the SLC area are faster than the write speed and read speed for each of the memory cells in the QLC area, respectively. The UFS 3.0 standard defines a high-speed write command. Writing with a high-speed write command is expected to be faster than writing with a normal write command. Further, data written to the non-volatile memory 2 by a high-speed write command is expected to be read out at a higher speed than data written by a normal write command. Accordingly, the memory controller 3 may perform writing in the SLC mode when writing with the high-speed command is specified, and may perform writing in the QLC mode when writing with the normal command is specified.

In general, data written to the memory system 1 mounted on a mobile terminal such as a smart phone may be broadly divided into (i) data that makes up the core of a system, such as an operating system (OS) and a kernel (hereinafter referred to as system data), and (ii) data stored by an end user, such as a photo, a video, and an application (hereinafter referred to as user data). The system data is system information for a smart phone, and tends to be read more frequently after being written. On the other hand, since the user data is read only when the user data is used, the frequency of reading tends to be relatively low. Accordingly, it is desirable that the system data be written to the SLC area in the SLC mode and read from the SLC area at high speed.

In the memory system 1, the garbage collection (that is also referred to as "compaction") is executed to increase the number of free blocks. The garbage collection is executed, for example, when the number of free blocks is equal to or less than a predetermined number. In the garbage collection, all valid data in a plurality of blocks (source blocks) in which the valid data and the invalid data coexist is moved to an erased block. The source block from which all valid data is moved is managed as a free block. The free block can be reused as a new write destination block after a data erase operation. The garbage collection may cause the system data written to the SLC area in response to a high-speed write command to be moved to the QLC area.

Further, the memory controller 3 cannot distinguish between the system data and the user data. Accordingly, the memory controller 3 cannot always reliably write the system data to the non-volatile memory 2 in the SLC mode. That is, even the system data may be written to the QLC area.

There is also a memory system that always writes data to a non-volatile memory in an SLC mode at the time of writing based on a write request from a host device and then moves the data from an SLC area to a QLC area. Even in this case, the system data written to the SLC area may be moved to the QLC area, and the system data cannot be read out at high speed.

<Measures>

Accordingly, in the present embodiment, data to be read at high speed, that is, the system data is determined, and data determined as the system data is always stored in the SLC area. A file system is adopted for data management in a PC, a smart phone, or the like. In a file system, a host address LBA assigned to an OS or a kernel is often known. For example, the system data such as the OS and the kernel is often assigned lower host address LBAs. The present embodiment uses the fact that the host address LBA of the system data may be known, and determines whether or not data to be written is the system data based on the host address LBA. For example, when the fact that system data is written to first 0 to 10 GB of the logical address space is known, the present embodiment treats data within that host address LBA range as the system data. In the present embodiment, the system data is written to the SLC area and is controlled to be moved to the SLC area even at the time of the garbage collection. To enable the control, the memory controller 3 of the present embodiment controls updating of the L2P table 12_a_.

<Write and Garbage Collection>

Figures 3, 4:
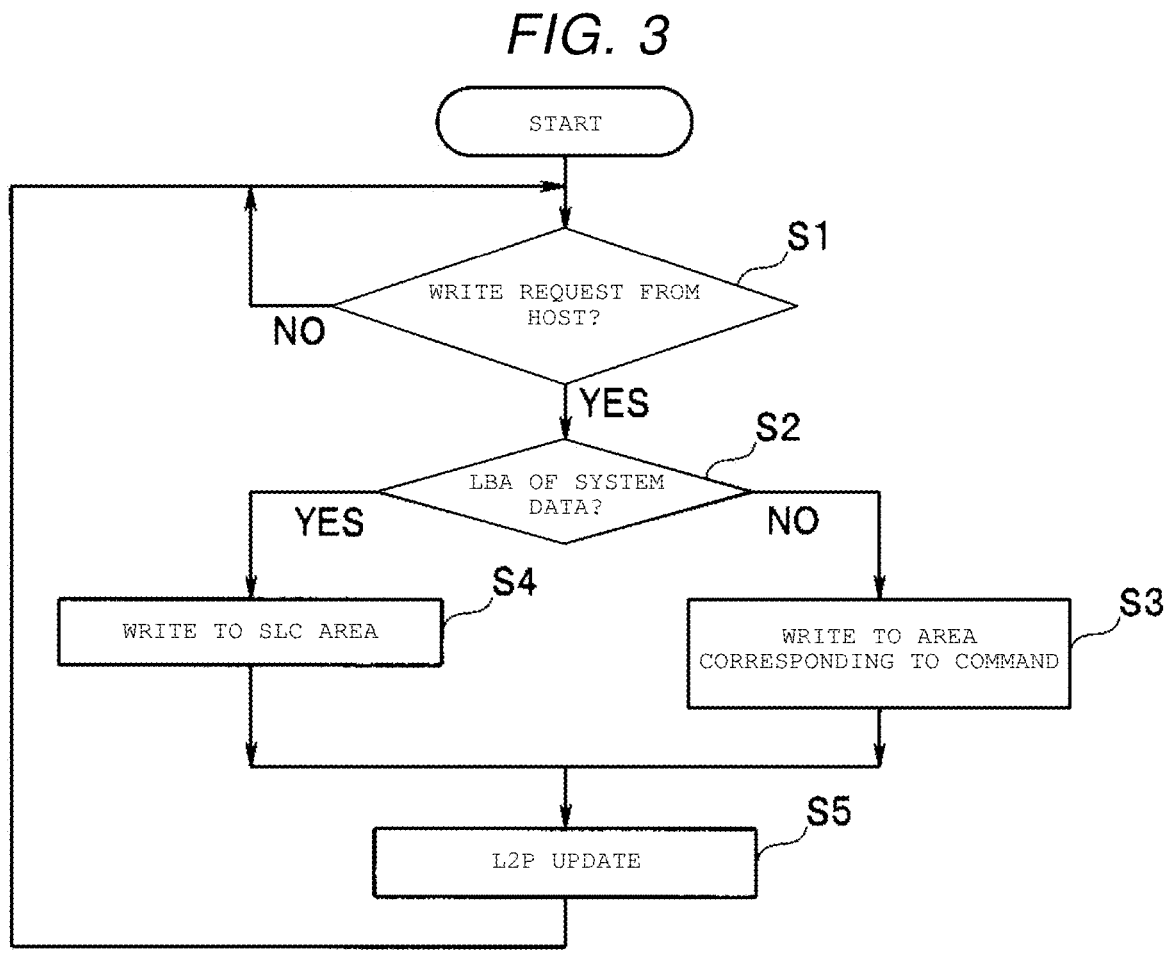

FIG. 3 is a flowchart showing an example of a data write operation by the processor 11 of the memory controller 3.

When the memory controller 3 receives a write request from the host device 4, the memory controller 3 executes the data write operation shown in FIG. 3. That is, the processor 11 in step S1 is in a standby state for a write request (write command) from the host device 4.

When the processor 11 receives a write request (YES in S1), the processor 11 determines whether the host address LBA of write data is an address defined or generally used as a logical address of the system data (hereinafter referred to as a system data address) (S2). When the host address LBA specified by the host device 4 is the system data address (YES in S2), the processor 11 determines that the data is the system data and writes the data to the SLC area (S4).

When the processor 11 determines that the host address LBA specified by the host device 4 is not the system data address (NO in S2), the processor 11 determines that the data is the user data, and writes the data to the area corresponding to the command from the host device 4. That is, the processor 11 writes the data to the SLC area when the data is requested to be written by the high-speed write command, and writes the data to the QLC area when the data is requested to be written by the normal write command (S3).

The processor 11 updates the L2P table 12$a$ to associate the host address LBA related in the write request with the memory address PBA to which the data is written in step S4 or step S4 (S5).

FIGS. 4 to 7 illustrate the content of the L2P table.

FIG. 4 shows a state before a data write operation is performed. The L2P table 12$a$ includes information on a host address (LBA), a memory address (PBA), and a valid-and-invalid flag. The host address LBA indicates a logical address specified by the host device 4. The memory address PBA indicates a physical address of a storage area of the non-volatile memory 2. The valid-and-invalid flag indicates whether the data stored at the address is valid data or invalid data. At the time of the garbage collection, the processor 11 of the memory controller 3 determines data of which valid-and-invalid flag indicates valid data, to be a target moved by the garbage collection.

FIG. 5 shows the state of the L2P table 12$a$ when data specified by host addresses LBA0 to LBA3 (e.g., system data addresses) is written to the non-volatile memory 2. The processor 11 writes data of which host address LBA is the system data address, to the SLC area regardless of which of a high-speed write command and a normal write command the write request is. In the following description, a logical address (host address LBA) x is denoted as LBAx. Further, a memory address PBA corresponding to a page PageW of a block BlkY is denoted as BlkY, PageW. The example of FIG. 5 shows that data of LBA0 is written to Blk0, Page0, data of LBA1 is written to Blk0, Page1, data of LBA2 is written to Blk0, Page2, and data of LBA3 is written to Blk0, Page3. Further, the valid-and-invalid flags of these memory addresses PBAs are "1" each indicating validity.

Here, it is assumed that the data in LBA3 is overwritten by the host device 4, for example. FIG. 6 is a diagram showing an example of the L2P table 12$a$ in this case. In this case, the data of LBA3, which is instructed to be written by the host device 4, is written to Blk0, Page4, which is an available area. Note that Blk0, Page4 is a memory address PBA of the SLC area. In this case, the valid-and-invalid flag of Blk0, Page3 is updated to "0" indicating invalidity, and the valid-and-invalid flag of Blk0, Page4 is updated to "1" indicating validity.

Next, it is assumed that the SLC area, for example Blk0, is to be garbage-collected. Even in this case, data with low host addresses LBAs, that is, data with the system data addresses is the system data. Accordingly, the processor 11 moves the data to the SLC area during the garbage collection.

FIG. 8 is a flowchart showing an example of garbage collection processing by the processor 11. When the processor 11 determines that garbage collection (GC) is necessary (YES in S6), the processor 11 refers to the L2P table 12$a$ (S7) to determine whether or not the data to be garbage-collected is data with the system data address (S8).

When the processor 11 determines that the data to be garbage-collected is data with the system data address (YES in S8), the processor 11 determines that the data is the system data, and moves the data in the SLC area (S9). Further, when the processor 11 determines that the data to be garbage-collected is not data with the system data address (NO in S8), the processor 11 determines that the data is the user data, and moves the data to the QLC area (S10).

The processor 11 updates the L2P table 12$a$ to associate the host address LBA of the garbage-collected data with the memory address PBA to which the data is written in step S9 or step S10 (S30).

FIG. 7 shows an example of the L2P table 12$a$ when the garbage collection targeting Blk0 is ended from the state shown in FIG. 6. The processor 11 writes the data of Blk0, Page0, Page1, Page2, and Page4 to the storage areas of other memory addresses PBAs (Blk1, Page0 to Page3 in FIG. 7) in the SLC area by the garbage collection. Note that Blk1, Page0 to Page3 are memory addresses PBAs in the SLC area. In this case, the valid-and-invalid flags of Blk0 are "0" each indicating invalidity, and the valid-and-invalid flags of Blk1, Page0 to Page3 are "1" each indicating validity. Although omitted in FIG. 7, valid data is also moved to the block Blk1 from blocks other than the block Blk0 by the garbage collection.

Since the system data is always stored in the SLC area in this manner, high-speed read is possible.

Figures 9, 10:
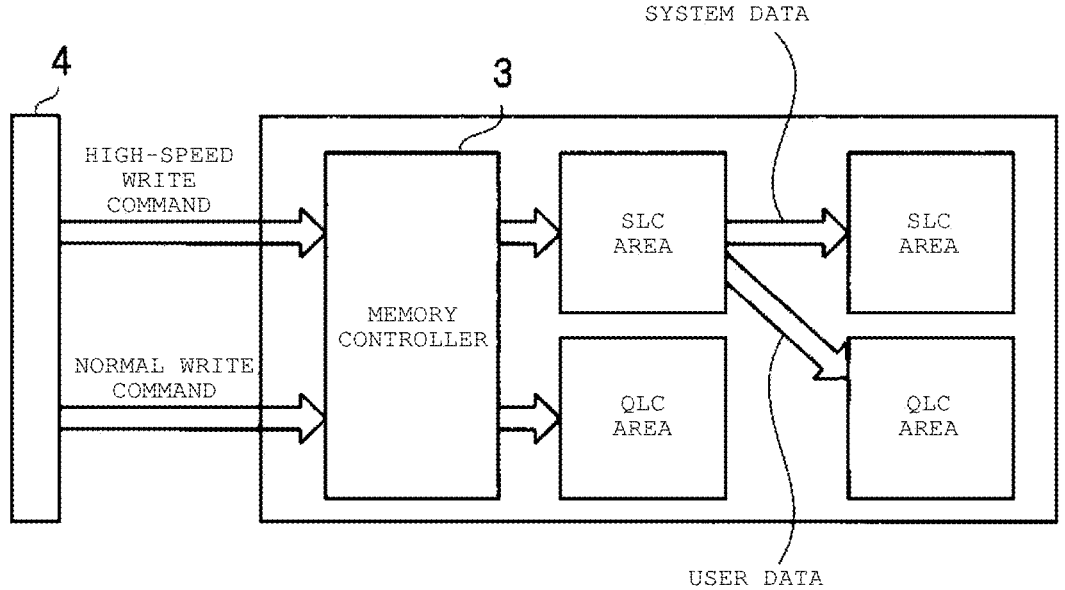
FIG. 9 illustrates an operation of garbage collection according to the first embodiment.
FIG. 10 illustrates a write format in a second embodiment.

FIG. 9 illustrates the operation of the garbage collection. The system data is written to the SLC area regardless of which of a high-speed write command and a normal write command the write request is. During the garbage collection, the processor 11 moves the system data to the SLC area. Meanwhile, the user data may also be written to the SLC area according to a high-speed write command. In this case, since the host address LBA of the user data is not the system data address, the processor 11 moves the user data to the QLC area during the garbage collection. Since the user data other than the system data is moved to the QLC area by the garbage collection, the memory area can be effectively utilized.

As described above, the present embodiment determines whether write data is the system data or the user data based on a host address LBA. The present embodiment writes the system data to the SLC area and also moves the system data to the SLC area during the garbage collection. As a result, the system data can be stored in the SLC area, high-speed read is possible, and low read latency can be achieved.

Second Embodiment

FIG. 10 illustrates a write format in the second embodiment. The hardware configuration of the present embodiment is the same as that of the first embodiment. In the first embodiment, whether or not write data is the system data is determined based on an range of the host addresses LBAs. On the other hand, in the present embodiment, the host device 4 adds information for determining the system data and the user data to a write command. For example, in the UFS standard, a reserved area is allocated in a write command. The host device 4 transmits a write command including information indicating the system data in the reserved area.

FIG. 11 is a diagram showing an example of a command format of a write command of the UFS standard. FIG. 11 shows data assigned to Bits 7 to 0 of each of Bytes 0 to 9 of the write command. Byte 0 is assigned OPERATION CODE. Byte 1 is assigned WRPROTECT, DPO, FUA, Reserved, FUA_NV, and Obsolete. Bytes 2 to 5 are assigned a host address LBA (LOGICAL BLOCK ADDRESS). Bytes 7 to 8 are assigned a data length (TRANSFER LENGTH). Byte 9 is assigned a control code (CONTROL).

Byte 6 is assigned a reserved area (Reserved) and GROUP NUMBER. For example, the host device 4 adds data identification information indicating whether the data is the system data or the user data to the reserved area (Reserved). Alternatively, the host device 4 may, for example, add the data identification information to GROUP NUMBER.

When the processor 11 receives a write command, for example, the processor 11 reads the data identification information written in the reserved area (Reserved), and determines whether the data instructed to be written by the write command is the system data or the user data. When the processor 11 determines that the data to be written by the write command is the system data, the processor 11 writes the system data to the SLC area. Furthermore, the processor 11 adds an identification flag indicating whether the written data is the system data to the write data (data body) and writes the write data along with the identification flag to the non-volatile memory 2. For example, the processor 11 writes the identification flag to a column address that is consecutive of the data body.

FIG. 10 shows the write format in this case. As shown in FIG. 10, the processor 11 adds an identification flag to the data body and writes the data body along and the identification flag. For example, the processor 11 may set "1" as the identification flag for the system data and set "0" as the identification flag for the user data.

Figure 12:
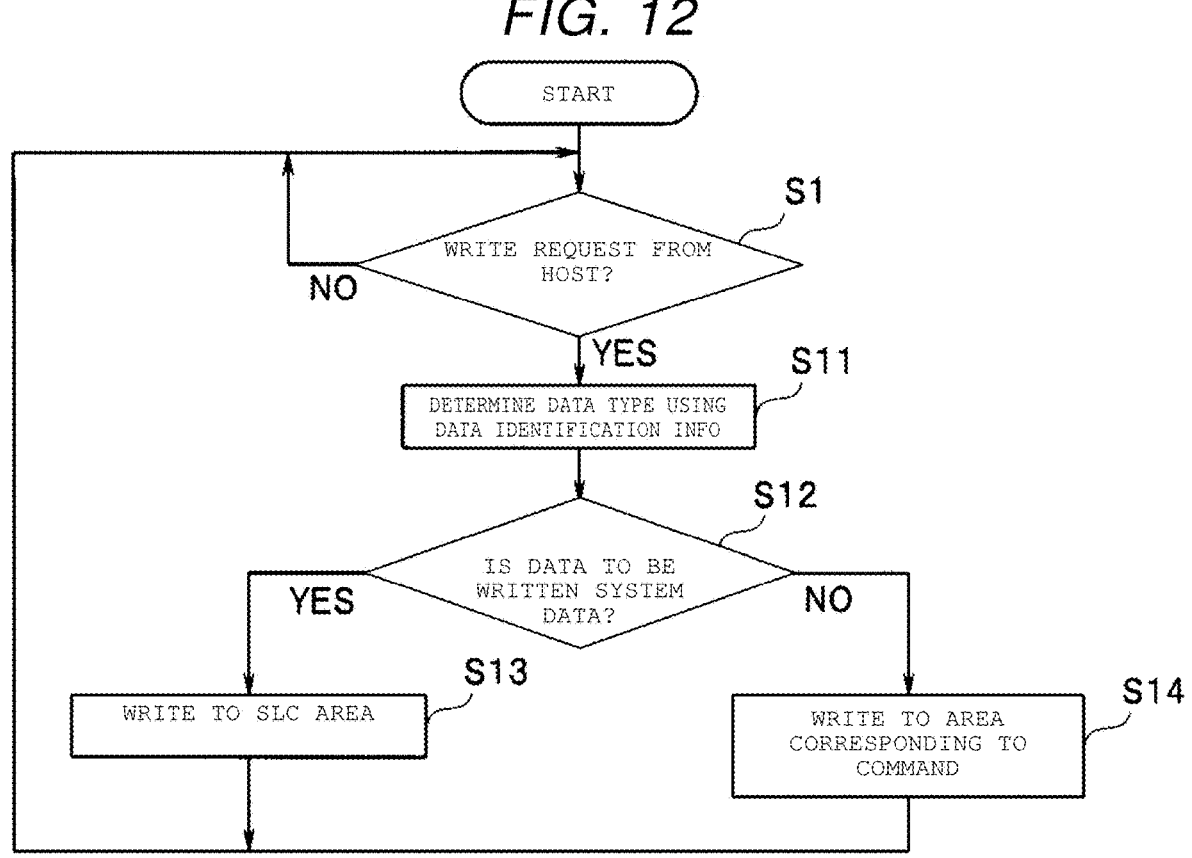
FIG. 12 is a flowchart showing an example of a data write operation by a memory controller according to the second embodiment.
Figures 13, 14:
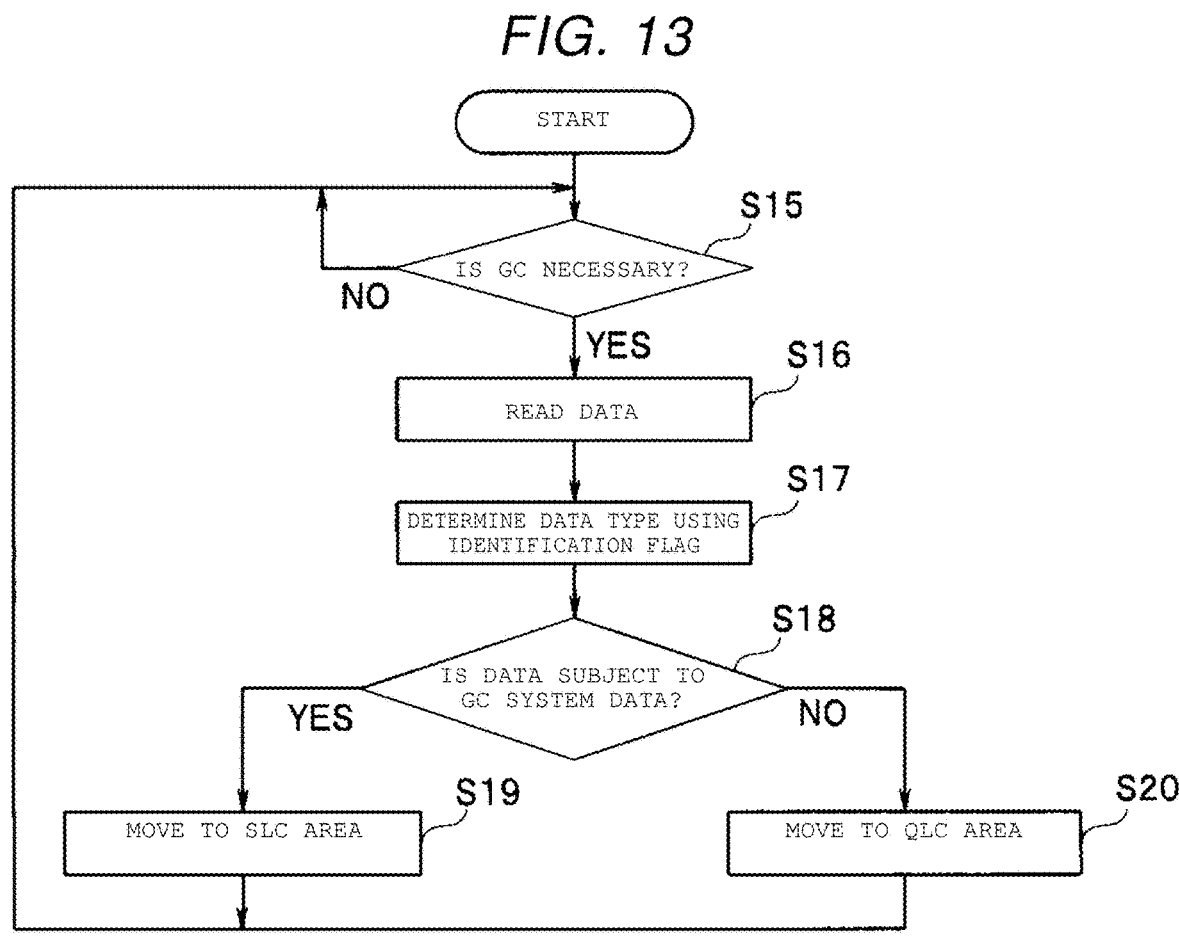

Next, the operation of the embodiment configured in this way will be described with reference to FIGS. 12 and 13. FIG. 12 is a flowchart of an operation during a data write operation, and FIG. 13 is a flowchart of an operation during the garbage collection.

When the memory controller 3 receives a write request (write command) from the host device 4, the memory controller 3 executes the data write operation shown in FIG. 12. That is, when the processor 11 receives a write request from the host device 4 (YES in S1), the processor 11 reads the data identification information included in the write command (S11), and determines whether or not the data to be written by the write command is the system data (S12).

When the processor 11 determines that the data from the host device 4 is the system data (YES in S12), the processor 11 writes the data to the SLC area (S13). Further, when the processor 11 determines that the data from the host device 4 is not the system data (NO in S12), the processor 11 writes the data to the area corresponding to the command from the host device 4. That is, the processor 11 writes the data to the SLC area when the data is requested to be written by a high-speed write command, and writes the data to the QLC area when the data is requested to be written by a normal write command (S14).

In the present embodiment, at the time of writing in steps S13 and S14, the processor 11 adds an identification flag indicating whether or not the data is the system data to the data body.

Next, it is assumed that the SLC area is to be garbage-collected. As shown in FIG. 13, when the processor 11 determines that the garbage collection (GC) is necessary (YES in S15), the processor 11 reads data to be garbage-collected (S16), and determines whether or not the data is the system data by using the identification flag (S17).

When the data to be garbage-collected is the system data (YES in S18), the processor 11 moves the data to the SLC area (S19). Further, when the processor 11 determines that the data to be garbage-collected is not the system data (NO in S18), the processor 11 moves the data to the QLC area (S20).

As described above, also in the present embodiment, the system data can always be stored in the SLC area, high-speed read is possible, and low read latency can be achieved.

Modification Example

FIGS. 14 to 17 show an example of the content of the L2P table in the modification example. In FIG. 10, an example of adding an identification flag based on the data identification information included in a write command from the host device 4 to the data body and writing the data body and the identification flag to the non-volatile memory 2 is described. On the other hand, FIGS. 14 to 17 are examples of recording data identification information in the L2P table 12a.

The processor 11 of the memory controller 3 writes the data identification information included in a write command from the host device 4 to the L2P table 12a. FIG. 14 shows a state before a data write operation is performed. The L2P table 12a includes data identification information in addition to the host address (LBA), the memory address (PBA), the valid-and-invalid flag information.

FIG. 15 shows the state of the L2P table 12a when data specified by the host addresses LBA0 to LBA3 is written to the non-volatile memory 2. Here, "System" in the L2P table 12a indicates the system data, and "User" indicates the user data. The data identification information of the L2P table 12a is obtained by the processor 11 extracting the data identification information included in the write command from the host device 4. Data for which LBA0 to LBA2 are specified is the system data, and data for which LBA3 is specified is the user data. The processor 11 writes the data indicated by the data identification information as the system data to the SLC area regardless of which of a high-speed write command and a normal write command the write request is. In the example of FIG. 15, the data of LBA0 is written to Blk0, Page0, the data of LBA1 is written to Blk0, Page1, and the data of LBA2 is written to Blk0, Page2. Note that Blk0 is included in the SLC area. Further, it is shown that the user data of LBA3 is written to Blk0, Page3 in the SLC area according to a write request by a high-speed write command. Further, the valid-and-invalid flags of these memory addresses PBAs are "1" each indicating validity.

Here, for example, it is assumed that the system data in LBA2 is overwritten by the host device 4. FIG. 16 shows an example of the L2P table 12a in this case. In this case, the data of LBA2, which is instructed to be written by the host device 4, is written to Blk0 and Page4, which is an available area. Note that Blk0, Page4 is a memory address PBA of the SLC area. In this case, the valid-and-invalid flag of Blk0, Page2 is "0" indicating invalidity, and the valid-and-invalid flag of Blk0, Page4 is "1" indicating validity.

Next, it is assumed that the SLC area, for example Blk0, is to be garbage-collected. The system data written to the SLC area is moved to the SLC area during the garbage collection. When the system data is stored in the block to be garbage-collected, the processor 11 moves the data to the SLC area. Further, when the user data is stored in the block to be garbage-collected, the processor 11 moves the data to the QLC area.

Figures 17, 18:
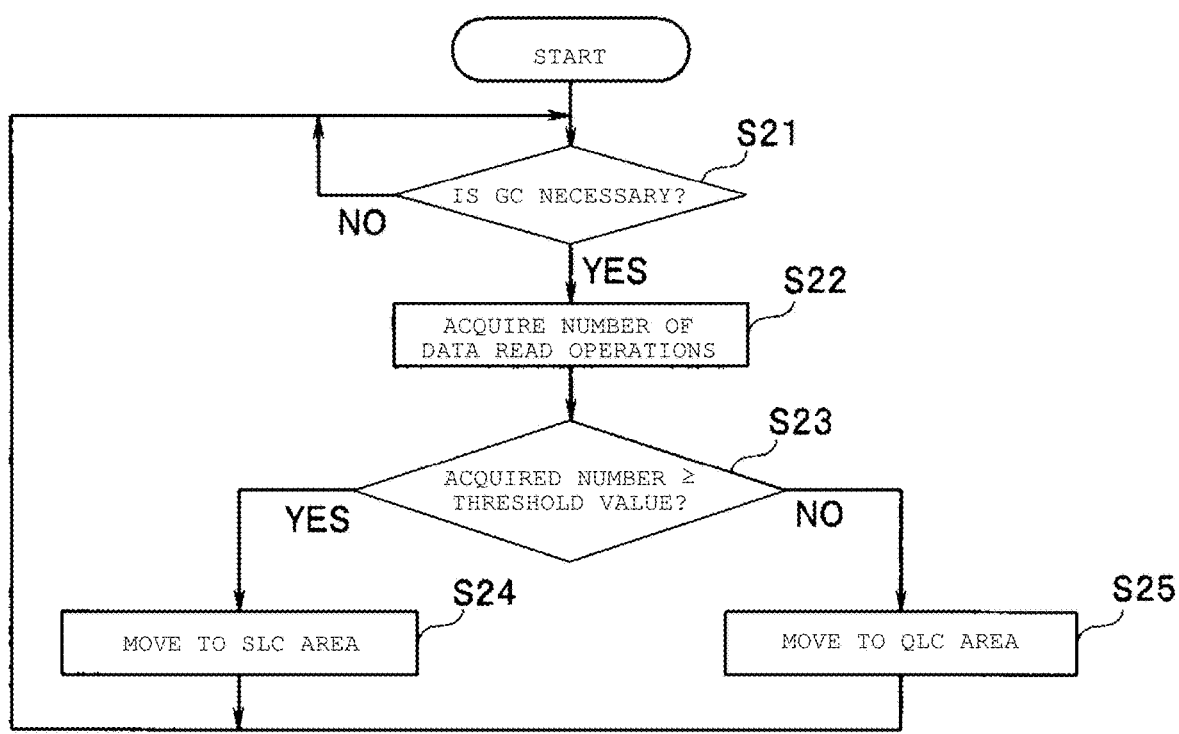

FIG. 17 shows an example of the L2P table 12a in this case. The processor 11 writes the data of Blk0, Page0, Page1, and Page4 to the storage areas of other memory addresses PBAs (Blk1, Page0 to Page2 in FIG. 17) in the SLC area by the garbage collection. Note that Blk1, Page0 to Page2 are the memory addresses PBAs in the SLC area. In this case, the valid-and-invalid flags of Blk0 are "0" each indicating invalidity, and the valid-and-invalid flags of Blk1, Page0 to Page2 are "1" each indicating validity. Further, the processor 11 moves the user data written in Blk0, Page3 to Blk11, Page0 in the QLC area.

Accordingly, also in the modification example, the system data can be stored in the SLC area, and high-speed read is possible. Further, since the user data is moved to the QLC area by the garbage collection, the memory area can be effectively utilized.

Third Embodiment

FIG. 18 is a flowchart showing an example of garbage collection processing by the processor 11 according to the third embodiment. The hardware configuration of the present embodiment is the same as that of the first embodiment. The first and second embodiments are examples of a case where predetermined information about the host address LBA of the system data is available or a case where data identification information indicating the system data is available. In the present embodiment, the memory controller 3 determines whether write data is the system data or the user data without such predetermined information or data identification information.

In general, the system data is characterized by few write accesses and many read accesses. Accordingly, the processor 11 of the memory controller 3 counts the number of data read operations of data for each host address LBA, and stores the information of the counted number in a management table. When the garbage collection is necessary, the processor 11 performs control by referring to the management table, determining that data of which the number of data read operations is equal to or greater than a predetermined threshold value is the system data to move the data to the SLC area, and determining that data of which the number of data read operations is less than the predetermined threshold value is the user data to move the data to the QLC area.

For example, the L2P table 12a may be employed as the management table for recording information of the counted number of data read operations. The garbage collection updates the memory address PBA associated with a certain host address LBA in the L2P table 12a, but retains other information of the certain host address LBA, including the number of data read operations.

Figures 19, 20:
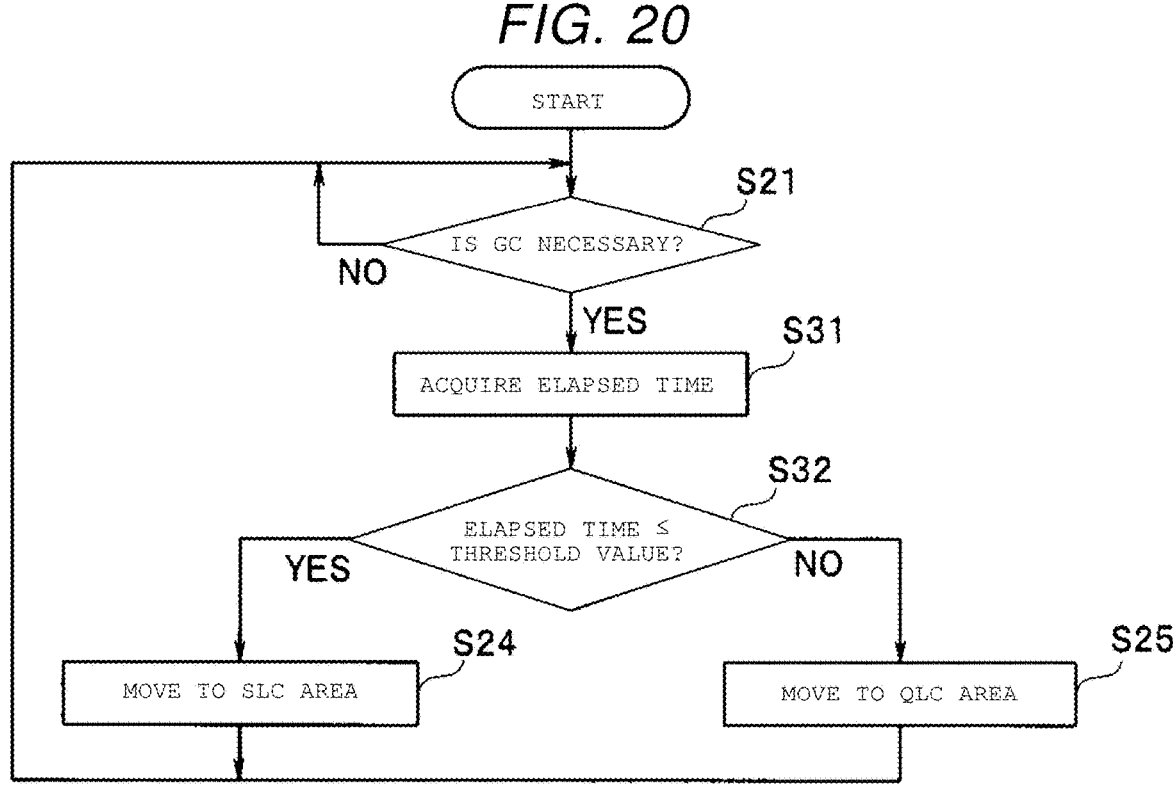
FIG. 19 is a diagram showing an example of an L2P table according to the third embodiment.
FIG. 20 is a flowchart showing an example of garbage collection processing by a memory controller according to a fourth embodiment.

Next, the operation of the embodiment will be described with reference to FIGS. 18 and 19. FIG. 19 is a diagram showing an example of the L2P table 12a including information of the number of data read operations. FIG. 19 shows an example in which data of LBA0 has the number of data read operations of 100, data of LBA1 has the number of data read operations of 1, data of LBA2 has the number of data read operations of 10, and data of LBA3 has the number of data read operations of 100. FIG. 19 shows the determination result between the system data and the user data when the threshold value is 100. Note that the L2P table 12a may not include the determination result.

In the present embodiment, the processor 11 counts the number of data read operations for each host address LBA. That is, when the processor 11 receives a read request from the host device 4, the processor 11 increments the number of data read operations of the L2P table 12a for the host address LBA specified by the read request. The number of data read operations of the data that is read increases. As a result, as shown in FIG. 19, it is assumed that the number of data read operations of the data of LBA0 and LBA3 is equal to or larger than 100 that is the threshold value.

In this state, Blk0 is assumed to be garbage-collected. As shown in FIG. 18, the processor 11 determines whether or not the garbage collection is necessary (S21). When the processor 11 determines that garbage collection is necessary (YES in S21), the processor 11 acquires the number of data read operations recorded for a host address LBA to be garbage-collected (S22). The processor 11 determines whether or not the acquired number of data read operations is equal to or greater than the threshold value (S23). The processor 11 determines that data of which the number of data read operations is equal to or greater than the threshold value is the system data (YES in S23), and moves the data to the SLC area (S24). Further, the processor 11 determines that the data of which the number of data read operations is less than the threshold value is the user data (NO in S23), and moves the data to the QLC area (S25).

As a result, in the example of FIG. 19, the data of LBA0 and LBA3 is moved to the SLC area as the system data, and the data of LBA1 and LBA2 is moved to the QLC area as the user data. Accordingly, the system data can be read out from the SLC area at high speed.

In this manner, the present embodiment can also obtain the same effect as the effect of each of the above-described embodiments. In the present embodiment, although even the system data may be written to the QLC area, the frequently read data is reliably moved to the SLC area and thus can be read at high speed.

Fourth Embodiment

FIG. 20 is a flowchart showing an example of garbage collection processing by the processor 11 according to the fourth embodiment. In FIG. 20, the same steps as in FIG. 18 are denoted by the same reference numerals, and descriptions thereof are omitted. The hardware configuration of the present embodiment is the same as that of the first embodiment. In the third embodiment, the system data with many data read operations is determined by managing the number of data read operations. In the present embodiment, system data is determined by an elapsed time since the last read time to the present.

The processor 11 of the memory controller 3 manages the access time for each data read operation, and obtains the difference from the current time, that is, the difference between the current time and the last read access time (i.e., elapsed time since the last read) for each host address LBA. When determination is made that garbage collection is necessary, the processor 11 refers to the management table and determines that data of which the elapsed time since the last read is shorter than or equal to a predetermined threshold value is the system data. The processor 11 performs control to move the data determined to be system data to the SLC area. The processor 11 determines that data of which the elapsed time since the last read is longer than the threshold value is the user data. The processor 11 performs control to move the data determined to be the user data to the QLC area.

For example, the L2P table 12a may be employed as the management table for registering information on the elapsed time since the last read. The garbage collection updates a memory address PBA associated with a certain host address LBA in the L2P table 12a, but retains other information of the certain host address LBA, including the elapsed time since the last read. Embodiments provide a memory system configured to enable an audio device of a connection destination to reproduce music information with higher quality.

Next, the operation of the embodiment will be described with reference to FIGS. 20 and 21. FIG. 21 is a diagram showing an example of the L2P table 12a including information on an elapsed time since the last read. FIG. 21 shows an example in which data of LBA0 has an elapsed time of 1 hour since the last read, data of LBA1 has an elapsed time of 10 minutes since the last read, data of LBA2 has an elapsed time of 2 days since the last read, and data of LBA3 has an elapsed time of 1 month since the last read. Note that, in FIG. 21, for description purpose, the L2P table 12a stores the elasped time since the last read for each host address LBA, but the L2P table 12a may alternatively or additionally store a timestamp of the last read access time for each host address LBA. FIG. 21 shows the determination result between the system data and the user data when the threshold value is 1 hour. Note that the L2P table 12a may not include the determination result.

In the present embodiment, the processor 11 manages the last read access time of each data for each host address LBA. That is, when the processor 11 receives a read request from the host device 4, the processor 11 manages the last read access time for the host address LBA specified by the read request. The elapsed time since the last read of the system data, for which the read request relatively frequently occurs, is relatively short. In the example of FIG. 21, the elapsed time since the last read of the data of LBA0 and LBA1 is shorter than or equal to the threshold value, and the elapsed time since the last read of the data of LBA2 and LBA3 is longer than the threshold value.

In this state, Blk0 is assumed to be garbage-collected. As shown in FIG. 20, when the processor 11 determines that the garbage collection is necessary (YES in S21), the processor 11 acquires the elapsed time since the last read recorded for a host address LBA to be garbage-collected (S31). The processor 11 determines whether or not the acquired elapsed time since the last read is equal to or less than the threshold value (S32). The processor 11 determines that data of which the elapsed time since the last read is shorter than or equal to the threshold value is the system data (YES in S32), and moves the data to the SLC area (S24). Further, the processor 11 determines that data of which the elapsed time since the last read is longer than the threshold value is the user data (NO in S32), and moves the data to the QLC area (S25).

As a result, in the example of FIG. 21, the data of LBA0 and LBA1 is moved to the SLC area as the system data, and the data of LBA2 and LBA3 is moved to the QLC area as the user data. Accordingly, the system data can be read out from the SLC area at high speed.

In this manner, the present embodiment can also obtain the same effect as the effect of the third embodiment.

Fifth Embodiment

FIG. 22 is a flowchart showing an example of garbage collection processing by the processor 11 according to the fifth embodiment. In FIG. 22, the same steps as in FIG. 18 are denoted by the same reference numerals, and descriptions thereof are omitted. The hardware configuration of the present embodiment is the same as that of the first embodiment. In the third embodiment, the system data with many data read operations is determined by managing the number of data read operations. In the present embodiment, determination is made on not only data read operations but also data write operations, such that determination is more accurately performed on whether or not data is the system data.

For example, in case of the user data that is frequently written and read, such as game data that is saved, it is conceivable that such data may be erroneously determined to be the system data based on determination by the number of data read operations alone. Accordingly, in the present embodiment, information on the number of data read operations and the number of data write operations is used to determine whether data is the system data or the user data.

The processor 11 of the memory controller 3 counts the number of data read operations for each host address LBA, and stores the information of the counted number in a management table. The processor 11 further counts the number of data write operations for each host address LBA, and stores the information of the counted number in the management table. The number of data write operations is incremented each time data is written with the same host address LBA specified, that is, each time data is overwritten.

When the processor 11 determines that the garbage collection is necessary, the processor 11 performs control by referring to the management table, determining that data of which the number of data read operations is equal to or greater than a first threshold value and of which the number of data write operations is less than a second threshold value is the system data, and moving the data to the SLC area. The processor 11 performs control by determining that data of which the number of data read operations is less than the first threshold value or of which the number of data write operations is equal to or greater than the second threshold value is the user data and moving the data to the QLC area.

For example, the L2P table 12a may be employed as the management table for registering information on the numbers of data write operations and data read operations. The garbage collection updates the memory address PBA associated with a certain host address LBA in the L2P table 12a, but retains other information of the certain host address LBA, including the counted numbers of data write operations and data read operations.

Next, the operation of the embodiment will be described with reference to FIGS. 22 and 23. FIG. 23 is a diagram showing an example of the L2P table 12a including information of the number of data read operations and data write operations. FIG. 23 shows an example in which data of LBA0 has the number of data write operations of 1 and the number of data read operations of 100, data of LBA1 has the number of data write operations of 1 and the number of data read operations of 1, data of LBA2 has the number of data write operations of 100 and the number of data read operations of 10, and data of LBA3 has the number of data write operations of 100 and the number of data read operations of 100. FIG. 23 shows the determination result between the system data and the user data when the second threshold value for the number of data write operations is 10 and the first threshold value for the number of data read operations is 100. Note that the L2P table 12a may not include the determination result.

In the present embodiment, the processor 11 counts the numbers of data write operations and data read operations of each data for each host address LBA. That is, when the processor 11 receives a write request from the host device 4, the processor 11 increments the number of data write operations of the L2P table 12a for the host address LBA specified by the write request. Further, when the processor 11 receives a read request from the host device 4, the processor 11 increments the number of data read operations of the L2P table 12a for the host address LBA specified by the read request. The number of data write operations of the overwritten data and the number of data read operations of the read data are increased. As a result, as shown in FIG. 23, it is assumed that the number of data write operations (1) of the data of LBA0 is less than the second threshold value (10) with the number of data read operations (100) thereof equal to or greater than the first threshold value (100), the number of data write operations (1) of the data of LBA1 is less than the second threshold value (10) with the number of data read operations (1) thereof less than the first threshold value (100), the number of data write operations (100) of the data of LBA2 is equal to or greater than the second threshold value (10) with the number of data read operations (10) thereof equal to or greater than the first threshold value (10), and the number of data write operations (100) of the data of LBA3 is equal to or greater than the second threshold value (10) with the number of data read operations (90) thereof less than the first threshold value (100).

In this state, Blk0 is assumed to be garbage-collected. As shown in FIG. 22, when the processor 11 determines that the garbage collection is necessary (YES in S21), the processor 11 acquires the number of data write operations and the number of data read operations recorded for a host address LBA to be garbage-collected (S33). The processor 11 determines whether or not the acquired number of data write operations is less than the second threshold value and the number of data read operations is equal to or greater than the first threshold value, that is, whether or not the data is the system data (S34). The processor 11 determines that the data of which the number of data write operations is less than the second threshold value and of which the number of data read operations is equal to or greater than the first threshold value is the system data (YES in S34), and moves the data to the SLC area (S24). Further, the processor 11 determines that the data of which the number of data write operations is equal to or greater than the second threshold value or of which the number of data read operations is less than the first threshold value is the user data (NO in S34), and moves the data to the QLC area (S25).

As a result, in the example of FIG. 23, the data of LBA0 is moved to the SLC area as the system data, and the data of LBA1 to LBA3 is moved to the QLC area as the user data. Accordingly, the system data can be read out from the SLC area at high speed.

In this manner, the present embodiment can also obtain the same effect as the effect of each of the above-described embodiments. In addition, in the present embodiment, more information than in the third embodiment is used to determine the system data, such that it is expected that highly accurate determination is possible.

Sixth Embodiment

FIG. 24 is a flowchart showing an example of garbage collection processing by the processor 11 according to the sixth embodiment. In FIG. 24, the same steps as in FIG. 18 are denoted by the same reference numerals, and descriptions thereof are omitted. The hardware configuration of the present embodiment is the same as that of the first embodiment. In the fourth embodiment, the system data for which a data read operation occurs frequently is determined based on the elapsed time since the last read. The present embodiment determines whether data is the system data or the user data based on the elapsed time since the last read and the elapsed time since the last write time to the present.

The processor 11 of the memory controller 3 manages the read access time for data for each host address LBA, obtains the elapsed time since the last read, and stores the elapsed time in the management table. The processor 11 further manages the write access time for data for each host address LBA, obtains the difference from the current time, that is, the difference between the current time and the last write access time (i.e., elapsed time since the last write), and stores the difference in the management table.

When the processor 11 determines that garbage collection is necessary, the processor 11 refers to the management table and determines that data of which the elapsed time since the last read is shorter than or equal to a third threshold value and data of which the elapsed time since the last write is longer than or equal to a fourth threshold value is the system data. The processor 11 performs control to move the data determined to be system data to the SLC area. Further, the processor 11 determines that data of which the elapsed time since the last read is longer than the third threshold value or of which the elapsed time since the last write is shorter than the fourth threshold value is the user data. The processor 11 performs control to move the data determined to be the user data to the QLC area.

For example, the L2P table 12a may be employed as the management table for registering information on the elapsed time since the last write and the elapsed time since the last read. Note that, in FIG. 25, for description purpose, the L2P table 12a stores the elapsed times since the last read and the last write for each host address LBA, but the L2P table 12a may alternatively or additionally store timestamps of the last read access time and the last write access time for each host address LBA. The garbage collection rewrites the memory address PBA associated with a certain host address LBA in the L2P table 12a, but retains other information of the certain host address LBA, including the elapsed time since the last write and the elapsed time since the last read.

Figures 25, 26:
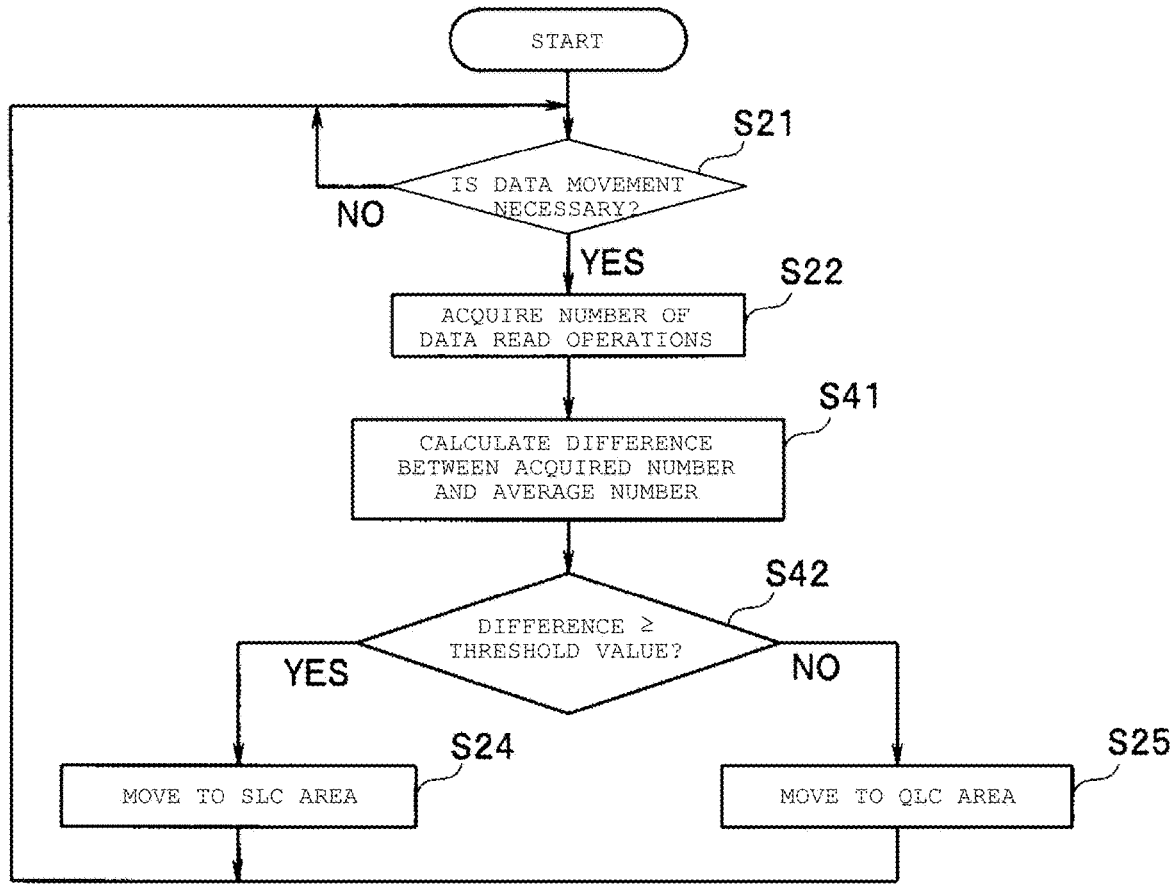
FIG. 25 is a diagram showing an example of an L2P table according to the sixth embodiment.
FIG. 26 is a flowchart showing an example of garbage collection processing by a memory controller according to a seventh embodiment.

Next, the operation of the embodiment will be described with reference to FIGS. 24 and 25. Fig. FIG. 25 is a diagram showing an example of the L2P table 12a including information on the elapsed time since the last read and the elapsed time since the last write. FIG. 25 shows an example in which data of LBA0 has an elapsed time of 1 month since the last write and an elapsed time of 1 hour since the last read, data of LBA1 has an elapsed time of 1 hour since the last write and an elapsed time of 10 minutes since the last read, data of LBA2 has an elapsed time of 1 month since the last write and an elapsed time of 2 days since the last read, and data of LBA3 has an elapsed time of 1 month since the last write and an elapsed time of 1 month since the last read. FIG. 25 shows the determination result between the system data and the user data when the fourth threshold value for the elapsed time since the last write is 1 month, and the third threshold value for the elapsed time since the last read is 1 hour. Note that the L2P table 12a may not include the determination result.

In the present embodiment, the processor 11 manages the last write access time and the last read access time of each data for each host address LBA. That is, when the processor 11 receives a write request from the host device 4, the processor 11 manages the last write access time for the host address LBA specified by the write request. Further, when the processor 11 receives a read request from the host device 4, the processor 11 manages the last read access time for the host address LBA specified by the read request. The elapsed time since the last read of the system data, which is read relatively frequently, is relatively short. Further, the elapsed time since the last write of the system data, which is rarely written (overwritten), is relatively long. In the example of FIG. 25, the data of LBA0 has an elapsed time (1 month) since the last write that is longer than or equal to the fourth threshold value (1 month) and an elapsed time (1 hour) since the last read that is shorter than or equal to the third threshold value (1 hour), and the data of LBA1 to LBA3 has an elapsed time since the last write that is shorter than the fourth threshold value (1 month) or an elapsed time since the last read that is longer than the third threshold value (1 hour).

In this state, Blk0 is assumed to be garbage-collected. As shown in FIG. 24, when the processor 11 determines that garbage collection is necessary (YES in S21), the processor 11 acquires the elapsed time since the last write and the elapsed time since the last read recorded for a host address LBA to be garbage-collected (S35). The processor 11 determines whether or not the acquired elapsed time since the last write is longer than or equal to the fourth threshold value and the elapsed time since the last read is shorter than or equal to the third threshold value, i.e., whether or not data is the system data (S36). The processor 11 determines that data of which the elapsed time since the last write is longer than or equal to the fourth threshold value and the elapsed time since the last read is shorter than or equal to the third threshold value is the system data (YES in S36), and moves the data to the SLC area (S24). Further, the processor 11 determines that data of which the acquired elapsed time since the last write is shorter than the fourth threshold value or the elapsed time since the last read is longer than the third threshold value is the user data (NO in S36), and moves the data to the QLC area (S25).

As a result, in the example of FIG. 25, the data of LBA0 is moved to the SLC area as the system data, and the data of LBA1 to LBA3 is moved to the QLC area as the user data. Accordingly, the system data can be read out from the SLC area at high speed.

In this manner, the present embodiment can also obtain the same effect as the effect of each of the above-described embodiments. In addition, in the present embodiment, more information than in the fourth embodiment is used to determine the system data, such that it is expected that highly accurate determination is possible.

In the above-described third to sixth embodiments, the memory controller 3 determines whether data is the system data or the user data, and in the timing of the garbage collection, determination different from the actual data type may be made. However, even in this case, by storing and updating information other than the memory address PBA before and after the garbage collection, it is expected that a determination result that matches the actual data type can be eventually obtained.

Seventh Embodiment

The present embodiment improves read disturb resistance. The hardware configuration of the present embodiment is the same as that of the first embodiment.

When a data read operation is executed on a block of the non-volatile memory, in the block, the number of error bits tends to increase in another word line different from a word line on which the data read operation is executed. In general, a memory system manages a threshold value for the number of error bits, the number of error bits is compared with the threshold value when a data read operation is executed, and refresh processing is performed to copy target data of the data read operation to another block when the number of error bits exceeds the threshold value. As a characteristic of the NAND flash memory, the susceptibility to an increase in the number of error bits greatly depends on a data storage method. For example, the number of error bits tends to increase as the number of bits stored in one memory cell increases. That is, read disturb resistance tends to be weaker as the number of bits stored in one memory cell increases. On the other hand, as described above, as the number of bits stored in one memory cell increases, the write speed to the NAND flash memory tends to decrease.

In a general memory system, different storage methods are used within the system depending on the application. Data with high write (update) frequency or data with high importance tends to be written to the SLC area in the SLC mode, and data with low write (update) frequency or data with low importance tends to be written to the QLC area in the QLC mode.

However, when data read operations occur frequently in a multi-level value area such as the QLC area, the number of times of the refresh processing may increase because the multi-level value area has low read disturb resistance. An increase in the number of times of the refresh processing may result that access performance of the memory system deteriorates.

Accordingly, in the present embodiment, the number of data read operations is recorded for each host address LBA, the difference between the number of data read operations and the average number is compared with a threshold value, and control is performed to store data in the SLC area or in the QLC area based on the comparison result. As a result, the present embodiment improves read disturb resistance.

The processor 11 of the memory controller 3 counts the number of data read operations for each host address LBA, and stores the information of the counted number in the management table. The processor 11 acquires the number of data read operations by referring to the management table at a predetermined timing or when the garbage collection is necessary, and obtains the difference between the acquired number of data read operations and the average number. The processor 11 acquires, for example, the average number for the entire non-volatile memory 2. The processor 11 may acquire, for example, the average number per block BLK. The processor 11 performs processing of moving data, of which the difference is equal to or greater than a predetermined threshold value, to the SLC area in order to improve read disturb resistance.

For example, the L2P table 12*a* may be employed as the management table for registering information of the count number of data read operations. The contents of the L2P table 12*a* in this case are the same as in the third embodiment described with reference to FIG. 19. The garbage collection updates the memory address PBA associated with a certain host address LBA in the L2P table 12*a*, but retains other information of the certain host address LBA, including the number of data read operations.

Figures 27, 28:
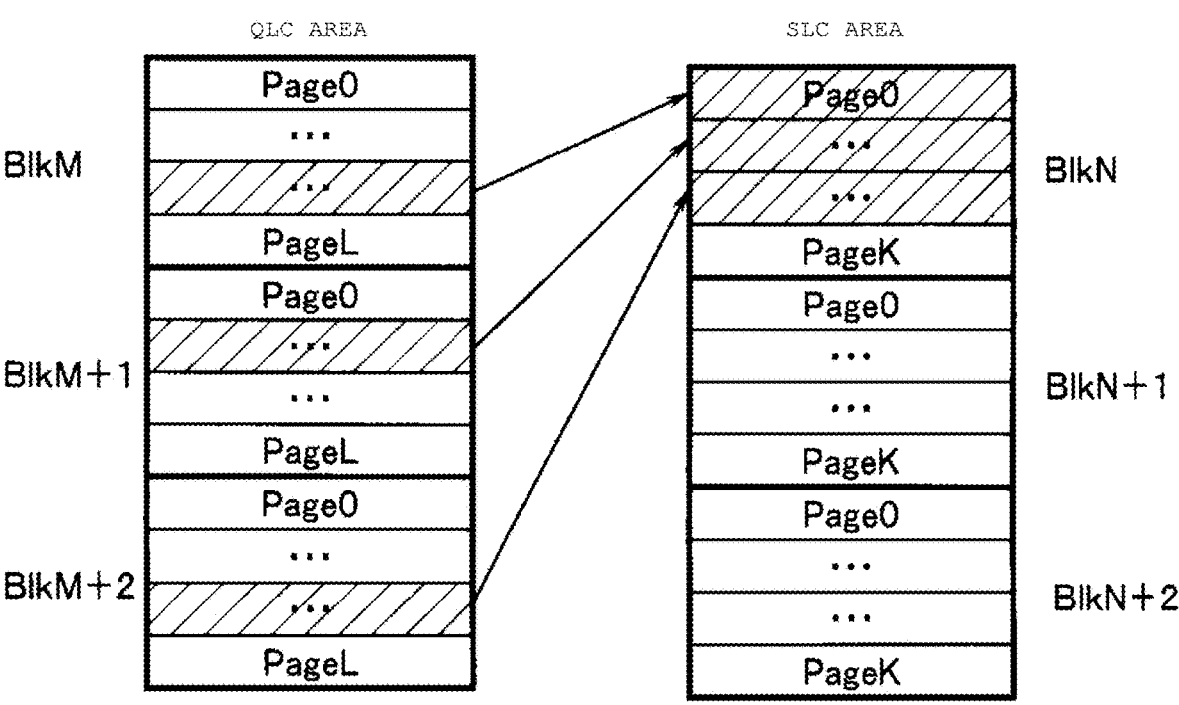
FIG. 27 illustrates data movement in the seventh embodiment.
FIG. 28 is a flowchart showing an example of data movement processing by the memory controller according to the seventh embodiment.

Next, the operation of the embodiment will be described with reference to FIGS. 26 to 29. FIG. 26 is a flowchart showing an example of garbage collection processing by the processor 11 according to the seventh embodiment. In FIG. 26, the same steps as in FIG. 18 are denoted by the same reference numerals, and descriptions thereof are omitted. FIG. 27 illustrates data movement in the multi-level value area and the SLC area. FIG. 27 shows the QLC area on the left and the SLC area on the right. The example on the left side of FIG. 27 shows blocks BlkM, BlkM+1, and BlkM+2 of the QLC area. Each of the blocks has pages Page0 to PageL. Further, the example on the right side of FIG. 27 shows blocks BlkN, BlkN+1, and BlkN+2 of the SLC area. Each of the blocks has pages Page0 to PageK. Here, K is less than L.

The processor 11 counts the number of data read operations for each host address LBA. That is, when the processor 11 receives a read request from the host device 4, the processor 11 increments the number of data read operations of the L2P table 12*a* for the host address LBA specified by the read request. The processor 11 obtains the difference between the number of data read operations and the average number of each host address LBA. The number of data read operations increases each time the data is read, and the difference between the number of data read operations for frequently read host address LBA and the average number increases. As a result, as shown in FIG. 27, it is assumed that the difference between the numbers of data read operations and the average number are equal to or greater than the threshold value for the data stored in pages (hatched portions) in the blocks BlkM, BlkM+1, and BlkM+2 in the QLC area.

In this state, it is assumed that the processing timing of data movement processing is reached. For example, the data movement processing may be performed simultaneously with the garbage collection. As shown in FIG. 26, the processor 11 determines the processing timing of the data movement processing (S21). For example, when the processor 11 determines that the garbage collection is necessary (YES in S21), the processor 11 acquires the number of data rea operations from the L2P table 12a (S22). The processor 11 obtains the difference between the acquired number of data read operations and the average number (S41), and determines whether or not the calculated difference is equal to or greater than a threshold value for each host address LBA (S42). In step S24, the processor 11 moves data for which the obtained difference is equal to or greater than the threshold value (YES in S42) to the SLC area as indicated by the arrow in FIG. 27. Meanwhile, in step S25, the processor 11 moves data for which the obtained difference is less than the threshold value (NO in S42) to the QLC area.

Hereinafter, data of which the number of data read operations is determined to be greater than the average number by the threshold value or more at the timing when the data movement processing is executed, is similarly moved to the SLC area. As a result, in the subsequent data read operations, the data of which the number of data read operations is determined to be greater than the average number by the threshold value or more, is stored in the SLC area with high read disturb resistance, such that an increase in the number of error bits can be suppressed.

When the number of data read operations for each data increases, the amount of data moved to the SLC area increases, and the available area in the SLC area decreases. Accordingly, when a free space of the SLC area falls below, for example, a predetermined threshold value, the processor 11 may execute the data movement processing by moving data with a relatively large number of data read operations to the SLC area and moving data with a relatively small number of data read operations to the QLC area.

Figure 29:
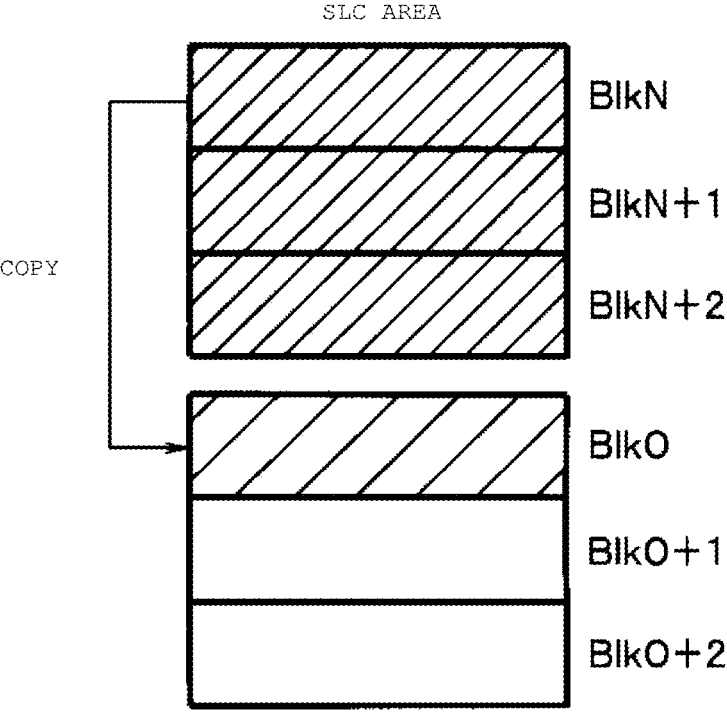
FIG. 29 illustrates data movement processing in the seventh embodiment.

FIG. 28 is a flowchart of the data movement processing. FIG. 29 illustrates the data movement processing. FIG. 29 shows blocks BlkN to BlkN+2 and blocks BlkO to BlkO+2 in the SLC area.

Now, it is assumed that the data movement processing is performed with respect to the blocks BlkN to BlkN+2 because the free space of the SLC area falls below a threshold value. As shown in FIG. 28, the processor 11 determines whether or not the processing timing of data movement processing is reached (S51). When the processing timing of the data movement processing is reached (YES in S51), the processor 11 refers to the L2P table 12a for the data stored in blocks BlkN to BlkN+2 and acquires the number of data read operations (S52). The processor 11 moves (copies) data having certain ranks in the number of data read operations from the top, to the SLC area (S54), and moves (copies) the other data to the QLC area (S55).

Note that the difference between the number of data read operations and the average number may be used for the determination of data to be moved.

The example of FIG. 29 shows that some data of the data stored in blocks BlkN to BlkN+2 is moved to the block BlkO. The processor 11 moves data, which is not moved to the block BlkO, of the data stored in blocks BlkN to BlkN+2 to the QLC area. As a result, the available area in the SLC area can be increased.

As described above, in the present embodiment, data of which the number of data read operations is relatively large can be stored in the SLC area, which has excellent read disturb resistance, and an increase in the number of error bits can be suppressed.

In the seventh embodiment, an example is shown in which the difference between the number of data read operations and the average number is determined based on a host address LBA, but the data movement processing may be executed by determining the difference between the number of data read operations and the average number based on a memory address PBA. Further, although it is described that information of the number of data read operations in the management table is retained even when the garbage collection is executed, the information of the number of data read operations may be reset for each garbage collection.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory having a first area and a second area each containing a plurality of blocks; and
a memory controller electrically connected to the non-volatile memory, and configured to perform a write operation on the non-volatile memory in response to a write command from a host by
writing system data in a first mode to a first block of the first area, the first mode being a write mode for writing data with a first number of bits per memory cell;
writing user data in the first mode to a second block of the first area when the write command is of a first type; and
writing user data in a second mode to a third block of the second area when the write command is of a second type,
wherein the second mode is a write mode for writing data with a second number of bits per memory cell, the second number of bits being larger than the first number of bits, and
wherein the memory controller is further configured to determine that data to be written is the system data or the user data based on identification information added to the write command, and to write the identification information along with the system data or the user data at a column address that is consecutive to that of the system data or the user data.

2. The memory system according to claim 1, wherein the memory controller is further configured to determine that data to be written to the first block is the system data based on logical addresses of the data.

3. The memory system according to claim 1, wherein the write command of the first type is a high-speed write command and the write command of the second type is a normal write command, and writing with the high-speed write command is expected to be faster than writing with the normal write command.

4. The memory system according to claim 3, wherein the first number of bits is one and the second number of bits is four.

5. A memory controller of a memory system including a non-volatile memory having a first area and a second area each containing a plurality of blocks, wherein the memory controller is electrically connected to the non-volatile memory and configured to perform a write operation on the non-volatile memory in response to a write command from a host by:

writing system data in a first mode to a first block of the first area, the first mode being a write mode for writing data with a first number of bits per memory cell;

writing user data in the first mode to a second block of the first area when the write command is of a first type; and writing user data in a second mode to a third block of the second area when the write command is of a second type, wherein the second mode is a write mode for writing data with a second number of bits per memory cell, the second number of bits being larger than the first number of bits, and wherein the memory controller is further configured to determine that data to be written is the system data or the user data based on identification information added to the write command, and to write the identification information along with the system data or the user data at a column address that is consecutive to that of the system data or the user data.

6. The memory controller according to claim 5, wherein the memory controller is further configured to determine that data to be written to the first block is the system data based on logical addresses of the data.

7. The memory controller according to claim 5, wherein the write command of the first type is a high-speed write command and the write command of the second type is a normal write command, and writing with the high-speed write command is expected to be faster than writing with the normal write command.

8. The memory controller according to claim 7, wherein the first number of bits is one and the second number of bits is four.

9. A method of executing a write operation in a memory system in response to a write command from a host, wherein the memory system includes a non-volatile memory having a first area and a second area each containing a plurality of blocks, said method comprising:

determining that data to be written is system data or user data based on identification information added to the write command;

writing the system data in a first mode to a first block of the first area, the first mode being a write mode for writing data with a first number of bits per memory cell;

writing the user data in the first mode to a second block of the first area when the write command is of a first type;

writing the user data in a second mode to a third block of the second area when the write command is of a second type; and writing the identification information along with the system data or the user data at a column address that is consecutive to that of the system data or the user data, wherein the second mode is a write mode for writing data with a second number of bits per memory cell, the second number of bits being larger than the first number of bits.

10. The method according to claim 9, further comprising:

determining that data to be written to the first block is the system data based on logical addresses of the data.

11. The method according to claim 9, wherein the write command of the first type is a high-speed write command and the write command of the second type is a normal write command, and writing with the high-speed write command is expected to be faster than writing with the normal write command.

12. The method according to claim 11, wherein the first number of bits is one and the second number of bits is four.

* * * * *